United States Patent
Veluswamy et al.

(10) Patent No.: US 8,016,354 B2
(45) Date of Patent: Sep. 13, 2011

(54) VEHICLE SEAT ASSEMBLY WITH STAND UP POSITION

(75) Inventors: Selvakumaresan Veluswamy, Farmington Hills, MI (US); Xiao Jun Wei, Canton, MI (US); John Scholl, Farmington Hills, MI (US); William John Gregory, White Lake, MI (US); Omar D. Tame, West Bloomfield, MI (US)

(73) Assignee: Intier Automotive Inc, Newmarket (CA)

( * ) Notice: Subject to any disclaimer, the term of this patent is extended or adjusted under 35 U.S.C. 154(b) by 235 days.

(21) Appl. No.: 11/916,042

(22) PCT Filed: Jun. 2, 2006

(86) PCT No.: PCT/CA2006/000887
§ 371 (c)(1),
(2), (4) Date: Nov. 30, 2007

(87) PCT Pub. No.: WO2006/128290
PCT Pub. Date: Dec. 7, 2006

(65) Prior Publication Data
US 2008/0224520 A1    Sep. 18, 2008

(51) Int. Cl.
*B60N 2/04* (2006.01)
*B60N 2/06* (2006.01)
*B60N 2/12* (2006.01)
*A47C 1/02* (2006.01)

(52) U.S. Cl. ....... 297/320; 297/336; 297/61; 297/344.1; 297/354.12

(58) Field of Classification Search .................... 297/61, 297/344.1, 378.12, 316, 331, 334–336, 408, 297/340, 354.12; 296/65.09
See application file for complete search history.

(56) References Cited

U.S. PATENT DOCUMENTS

| | | | |
|---|---|---|---|
| 3,011,581 A | | 12/1961 | Wood |
| 4,394,048 A | * | 7/1983 | Sakurai et al. ............ 297/367 R |
| 4,699,418 A | | 10/1987 | Plavetich |
| 4,736,985 A | | 4/1988 | Fourrey et al. |
| 5,383,699 A | | 1/1995 | Woziekonski et al. |
| 6,000,742 A | | 12/1999 | Schaefer et al. |
| 6,174,017 B1 | | 1/2001 | Salani et al. |
| 6,520,581 B1 | | 2/2003 | Tame |
| 6,578,919 B2 | | 6/2003 | Seibold et al. |
| 6,595,588 B2 | | 7/2003 | Ellerich et al. |
| 6,655,738 B2 | | 12/2003 | Kammerer |
| 6,688,666 B2 | | 2/2004 | Neale et al. |
| 6,860,564 B2 | * | 3/2005 | Reed et al. ................. 297/408 |
| 6,899,392 B1 | * | 5/2005 | Saberan et al. ............ 297/334 |
| 2001/0050502 A1 | | 12/2001 | Fourrey et al. |
| 2004/0251705 A1 | | 12/2004 | Tame et al. |
| 2006/0138839 A1 | * | 6/2006 | Ryan et al. ................. 297/340 |
| 2009/0230744 A1 | * | 9/2009 | Szybisty et al. ............ 297/335 |

* cited by examiner

Primary Examiner — Milton Nelson, Jr.
(74) Attorney, Agent, or Firm — Miller Canfield

(57) ABSTRACT

A seat assembly has a seat cushion that is pivotally mountable to a vehicle floor. The seat cushion is selectively movable between an operative condition and a standup condition. A seat back is pivotally mounted to the seat cushion and is selectively movably angularly relative to the seat cushion. A pair of hinges pivotally receives the seat back and is linked to the seat cushion, whereby movement of the seat cushion from the operative condition to the standup condition rotates the pair of hinges, generally aligning the seat cushion and the seat back when the seat cushion is tumbled forward.

23 Claims, 19 Drawing Sheets

VEHICLE SEAT ASSEMBLY WITH STAND UP POSITION

FIELD OF THE INVENTION

The invention relates to seat assemblies for an automotive vehicle. More particularly, the invention relates to improvements in seat assemblies of the type that are capable of being moved forwardly and upwardly to provide access to a rear compartment in the vehicle.

BACKGROUND OF THE INVENTION

In certain minivan and sport utility vehicles, it is common to provide second and third row seating. In order to provide better access to the third row seating or cargo area behind the second row seating, the second row seating has a releasable seat back locking mechanism which is capable of being manually actuated to move the seat back forwardly to an access position. Optionally, the seat assembly may be tumbled forward to provide additional room for ingress and egress.

It has been proposed in U.S. Pat. No. 6,676,216, to provide a seat assembly that has a seat cushion that pivots forward from a generally horizontal seating position to a vertical or stand-up position and a seat back that moves from a first vertical position for supporting an occupant, to a second vertical position forward and upward of the first vertical position to provide greater access to the third row. The seat cushion moves independently of the seat back requiring a two step process for operation. Further, the seat assembly is mounted to the vehicle floor allowing only a fixed location of the seat assembly, without any fore and aft adjustability.

It would therefore be desirable to provide a seat assembly having the seat back operatively coupled to the seat cushion such that the seat back moves from the first vertical position to the second vertical position as the seat cushion moves from the seating position to the stand-up position. It would also be desirable for the seat back to self-lock in the first vertical position when the seat cushion is returned to the seating position. Further, it would be desirable to provide fore and aft adjustability of the seat assembly.

SUMMARY OF THE INVENTION

According to one aspect of the invention, a seat assembly is provided for supporting an occupant above a floor in an automotive vehicle. The seat assembly includes a seat back and a seat cushion. The seat cushion is adapted for mounting to the floor and extends between a forward end and a rearward end. The seat cushion is releasably coupled to the floor at the rearward end and selectively pivotable about the forward end. The seat assembly further includes a pair of hinge assemblies extending between an upper end operatively coupled to the seat back and a lower end pivotally coupled to the seat cushion. The hinge assemblies allow for pivotal movement of the seat back as the seat assembly moves between a seating position and a stand-up position in which the seat cushion and seat back are generally vertically aligned. At least one drive link extends between a first end pivotally coupled to the floor at the forward end of the seat cushion and a second end pivotally coupled to the hinge assemblies. The drive link controls the pivotal movement of the seat back as the seat assembly moves between the seating and stand-up positions.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
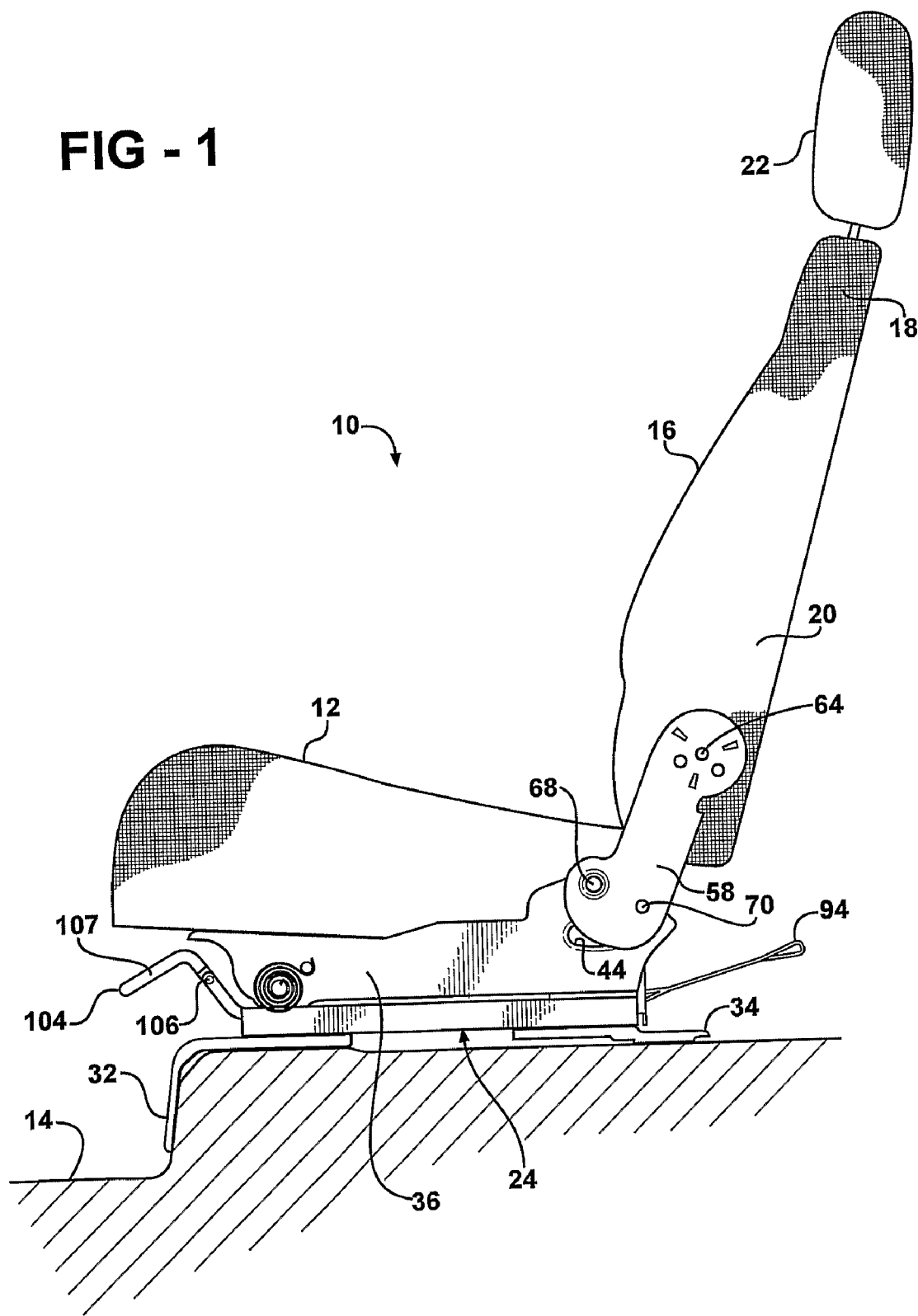
FIG. 1 is a side view of a seat assembly in a seating position according to the invention.

Referring to FIG. 1, a seat assembly for an automotive vehicle is generally shown at 10. The seat assembly 10 includes a generally horizontal seat cushion 12 for supporting a seat occupant above a floor 14 in the vehicle. The seat cushion 12 includes a contoured foam pad (not shown) encased by a trim cover (not shown) and supported by a seat-pan (not shown). The seat assembly 10 also includes a seat back 16, extending between an upper end 18 and a lower end 20, operatively coupled to the seat cushion 12. The seat back 16 includes a contoured foam pad (not shown) encased by a trim cover (not shown). The seat assembly 10 further includes a head restraint 22 operatively coupled to the upper end 18 of the seat back 16.

Figure 2:
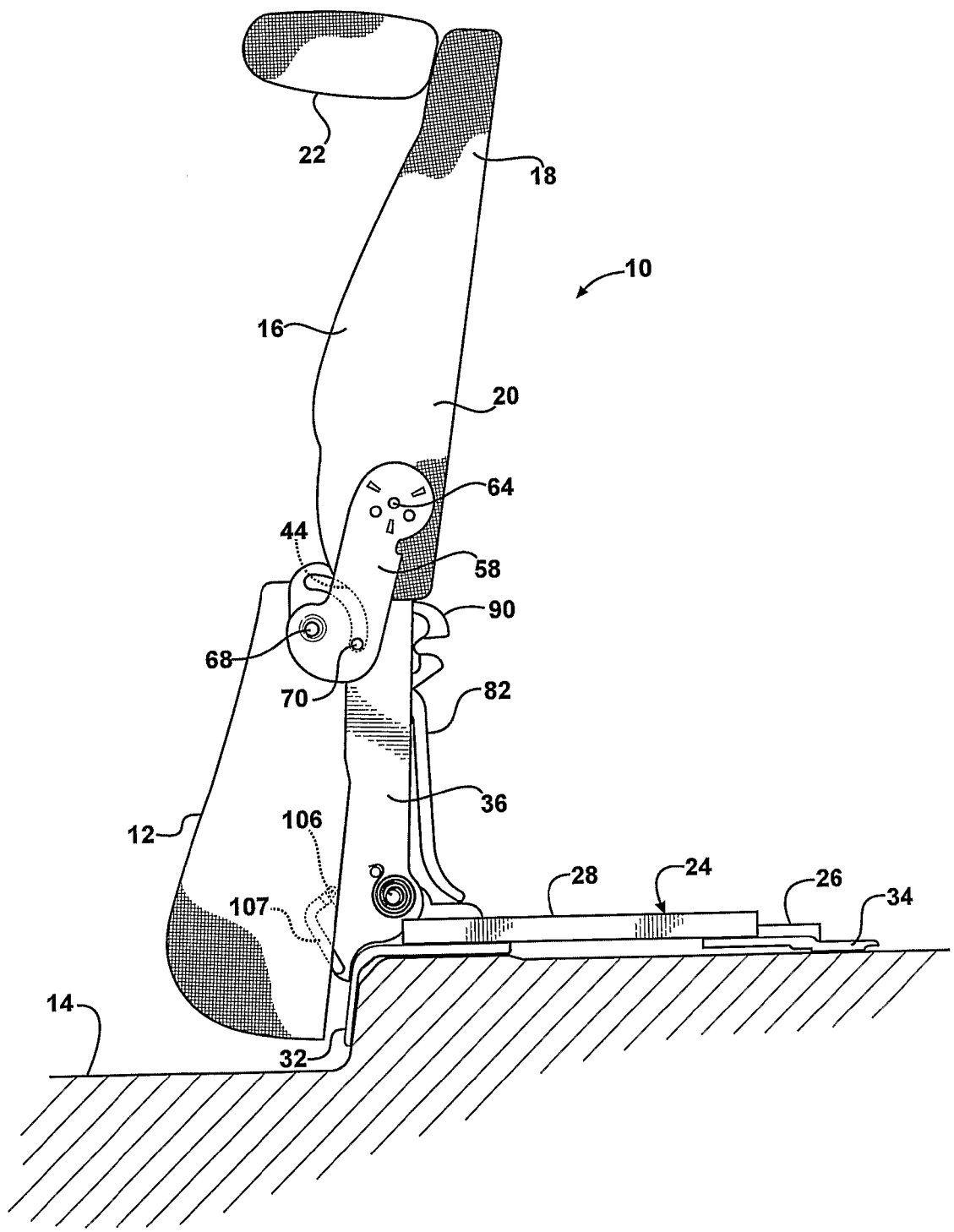
FIG. 2 is a side view of the seat assembly in a stand-up position.
Figure 3:
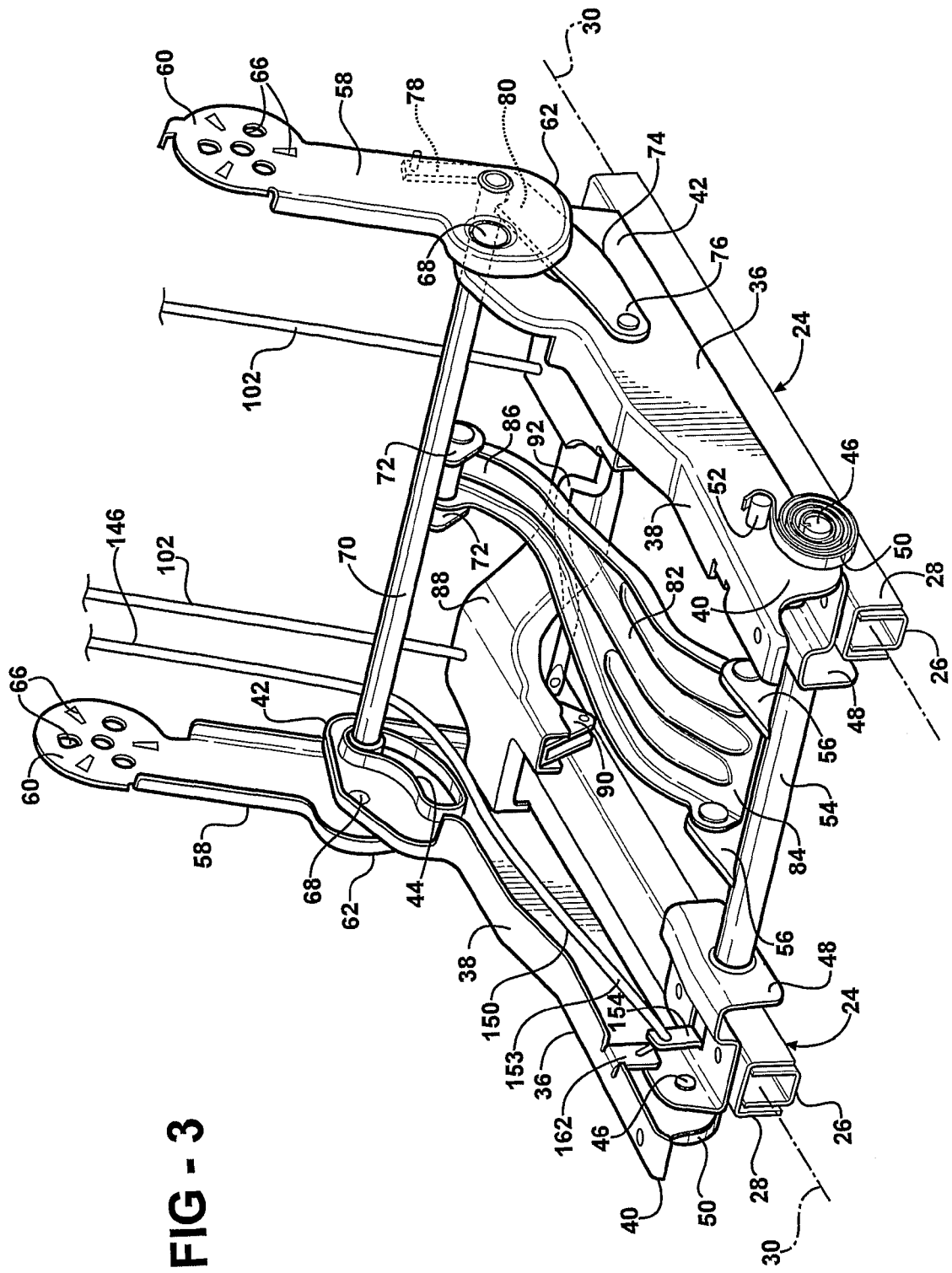
FIG. 3 is a fragmentary, perspective view of the seat assembly showing a drive link for guiding the seat assembly between the seating and stand-up positions.

Referring to FIGS. 1 through 3, a pair of laterally spaced apart track mechanisms, generally indicated at 24, is provided for adjusting the seat assembly 10 fore and aft. The track mechanisms 24 include a fixed track 26 and a moveable track 28 slidably engaging the fixed track 26. The fixed 26 and moveable 28 tracks define a longitudinal axis 30. The moveable tracks 28 are slidably adjustable relative to the fixed tracks 26 along the longitudinal axis 30. The fixed tracks 26 are fixedly secured to forward floor mounts 32 and rearward floor mounts 34, which in turn are fixedly secured to the floor 14.

Referring to FIG. 3, a pair of laterally spaced apart support brackets 36 include a flange 38 extending therealong, providing rigidity to the support brackets 36. The seat-pan of the seat cushion 14 is fixedly secured to the flange 38 of each support bracket 36. Each support bracket 36 extends between a forward end 40 and a rearward end 42. The rearward end 42 of each support bracket 36 includes an arcuate slot 44. The forward end 40 of each support bracket 36 is pivotally coupled by a main pivot pin 46 to a base plate 48. The base plates 48 are disposed inward of the support brackets 36 and are adapted to mount to the moveable tracks 28. The seat cushion 12 pivots about the main pivot pins 46 as the seat assembly 10 moves between a seating position, shown in FIG. 1, and a stand-up position, shown in FIG. 2. A torsion spring 50 extends between each of the main pivot pins 46 and a post 52 (one shown) fixedly secured at the forward end 40 of each support bracket 36. The torsion springs 50 urge the support brackets 36, and therefore the seat cushion 12, to pivot upwardly and forwardly about the main pivot pins 46. A forward rod 54 extends between and is fixedly secured to the base plates 48. A pair of tabs 56 fixedly secured to the forward rod 54 extend rearwardly therefrom.

A pair of laterally spaced apart hinge assemblies 58 pivotally coupling the seat back 16 to the seat cushion 12 allow for pivoting the seat back 16 between a first vertical position, as shown in FIG. 1, when the seat assembly 10 is in the seating position and a second vertical position, forward and upward of the first vertical position, as shown in FIG. 2, when the seat assembly 10 is in the stand-up position. Each hinge bracket 58 extends between an upper end 60 and a lower end 62. The upper end 60 of each hinge bracket 58 is pivotally coupled to the lower end 20 of the seat back 16. More specifically, the upper end 60 of each hinge bracket 58 is configured to receive a recliner mechanism 64 of any suitable type known in the art. The recliner mechanisms 64 are disposed between the upper ends 60 of the hinge assemblies 58 and the lower end 20 of the seat back 16. In the preferred embodiment, the upper end 60 of each hinge bracket 58 includes a series of apertures 66 that complementarily fit with embossments on the recliner mechanisms 64. The recliner mechanisms 64 are operable between a locked state and an unlocked state allowing for selective angular adjustment of the seat back 16 relative to the seat cushion 12.

The lower end 62 of each hinge bracket 58 is pivotally coupled to the rearward end 42 of the respective support bracket 36 at pivot 68. Additionally, a rearward rod 70 extending between the lower ends 62 of the hinge assemblies 58 is disposed within the arcuate slots 44 of the support brackets 36. The arcuate slots 44 guide the rearward rod 70 as the hinge assemblies 58 pivot relative to the support brackets 36. A pair of tabs 72 fixedly secured to the rearward rod 70 extend rearwardly and downwardly therefrom.

Referring to FIG. 3, a seat back lock mechanism 74 (one shown) extends between a first end 76 pivotally coupled to the rearward end 42 of each support bracket 36 and a second end 78 pivotally coupled to the lower end 62 of each hinge bracket 58. Each seat back lock mechanism 74 includes a cam surface 80 contoured to lockingly engage the rearward rod 70 when the seat cushion 12 is in the seating position, thereby preventing the seat back 16 from pivoting between the first vertical position and the second vertical position.

A drive link 82 is provided for moving the seat back 16 between the first vertical position, shown in FIG. 1, and the second vertical position, shown in FIG. 2, as the seat cushion 12 moves between the seating position and the stand-up position. The drive link 82 extends between a first end 84 and a second end 86. The first end 84 is pivotally coupled between the tabs 56 extending from the forward rod 54. The second end 86 is pivotally coupled between the tabs 72 extending from the rearward rod 70.

Referring to FIG. 3, a cross member 88 extends between and is fixedly secured to the rearward ends 42 of the support brackets 36. A pair of conventional floor latches 90 (one shown) is fixedly secured to the cross member 88 and are positioned to engage a striker bar (not shown) extending between the moveable tracks 28. The floor latches 90 actuate between a latched position secured to the striker bar and an unlatched position released from the striker bar.

A floor latch release handle 92 extends between and is operatively coupled to the floor latches 90. A strap 94, shown in FIG. 1, is fixedly secured to the floor latch release handle 92. Manipulating the strap 94 actuates the release handle 92 thereby actuating the floor latches 90 from the latched position to the unlatched position, simultaneously.

A pair of first Bowden-type cable assemblies 102, extend between a release lever (not shown) operatively coupled to the seat back 16 and the floor latches 90. Actuating the release lever pulls the first cable assemblies 102, thereby actuating the floor latches 90 from the latched position to the unlatched position, simultaneously.

Referring to FIG. 1, a towel bar 104 is shown in a use position extending forwardly from the track mechanisms 24 and laterally therebetween. The towel bar 104 is operatively coupled to the track mechanisms 24 such that upward movement of the towel bar 104 will unlatch the moveable tracks 28 from the fixed tracks 26 to allow fore and aft sliding adjustment of the seat assembly 10. The towel bar 104 includes hinges 106 allowing a forward portion 107 of the towel bar 104 to fold to a stowed position when the seat cushion 12 is moved to the stand-up position, as shown in FIG. 2. More specifically, as the seat cushion 12 is moved to the stand-up position the seat-pan abuts the forward portion 107 of the towel bar 104 causing it to fold downward to the stowed position. As the seat cushion 12 is returned to the seating position a bias spring (not shown) urges the forward portion 107 back to the use position.

Figure 4:
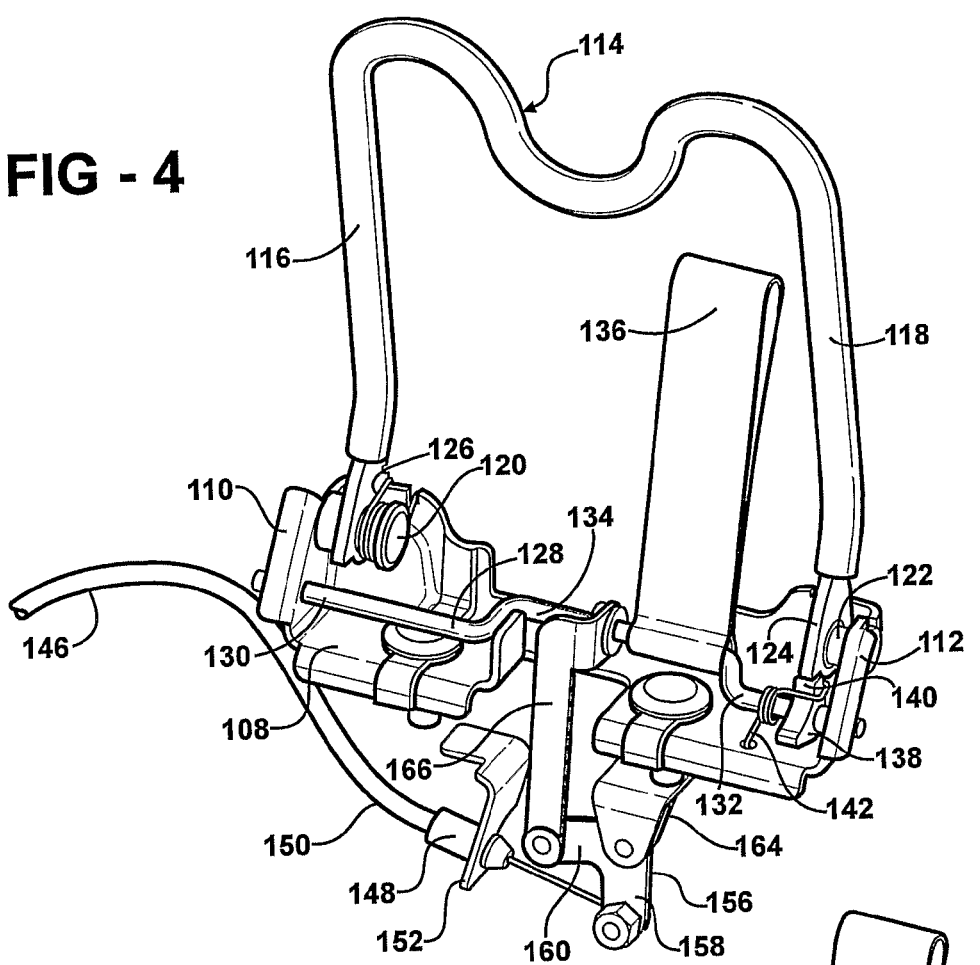
FIG. 4 is an enlarged, perspective view of a head restraint armature in an operative position.

The head restraint 22 is moveable between an operative or upright position, extending generally vertically from the seat back 16 as shown in FIG. 1, and a stowed or forwardly folded position, at a transverse angle from the seat back 16 as shown in FIG. 2. Referring to FIG. 4, the head restraint 22 includes a base bracket 108 adapted to be fixedly secured to an upper frame member (not shown) within the seat back 16. The base bracket 108 includes laterally spaced apart first 110 and second 112 upright supports. The head restraint 22 also includes an armature, generally indicated at 114. The armature 114 includes laterally spaced apart first 116 and second 118 legs. The first leg 116 is pivotally coupled to the first upright support 110 at pivot 120 and the second leg 118 is pivotally coupled to the second upright support 112 at pivot 122. The second leg 118 includes an integral sector 124 at pivot 122. A first torsion spring 126 extends between the first leg 116 and the first upright support 110 biasing the head restraint 22 to the stowed position.

A release arm 128 includes a first end 130, a second end 132, and a middle portion 134 extending therebetween. A strap 136 is fixedly secured to the middle portion 134 of the release arm 128. The release arm 128 is rotatably coupled at the first end 130 to the first upright support 110 and at the second end 132 to the second upright support 112. A locking cam 138 is disposed at the second end 132 of the release arm 128 such that the locking cam 138 rotates with the release arm 128. The release arm 128 rotates between an initial position, shown in FIG. 4, wherein a lobe 140 of the locking cam 138 engages the sector 124 and a rotated position, shown in FIG. 5, wherein the lobe 140 is away from the sector 124. A second torsion spring 142 extends between the lobe 140 of the locking cam 138 and the base bracket 108, biasing the release arm 128 to the initial position. Manipulating the strap 136 rotates the release arm 128 from the initial position to the rotated position, thereby actuating the head restraint 22 from the upright position to the stowed position.

Figure 5:
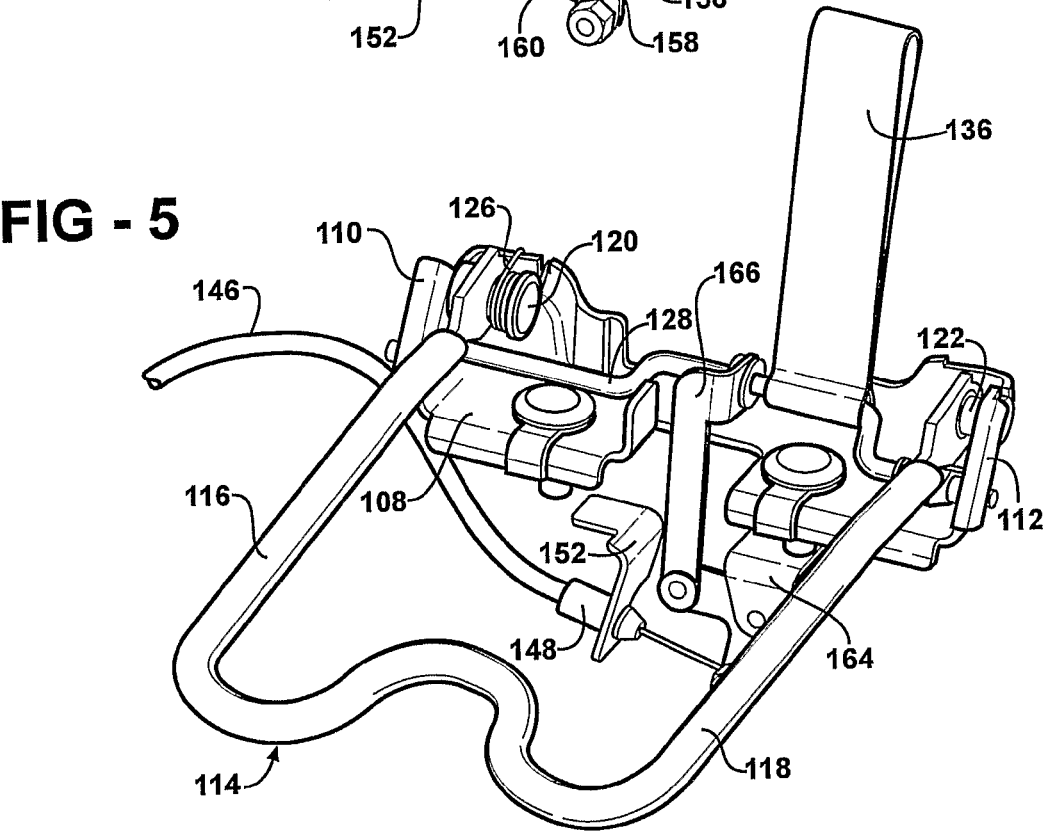
FIG. 5 is an enlarged, perspective view of the head restraint armature in a stowed position.

Additionally, referring to FIGS. 3 through 5, a second Bowden-type cable assembly 146 is provided for automatically actuating the head restraint 22 from the operative position to the stowed position as the seat cushion 12 moves to the stand-up position. The second cable assembly 146 is held at a first end 148 by a bracket 152 mounted to the upper frame member of the seat back 16, as shown in FIG. 4, and at a second end 153 by a first tab 154 mounted to one of the base plates 48, as shown in FIG. 3. A lever 156 is operatively coupled to the release arm 128 for rotating the release arm 128 between the initial and rotated positions. The lever 156 extends between a first end 158 and a second end 160. The second cable assembly 146 extends between the first end 158 of the lever 156, as shown in FIG. 4, and a second tab 162 mounted to the support bracket 36 adjacent the first tab 154, as shown in FIG. 3. The lever 156 is pivotally coupled to a bracket 164 fixedly secured to the base bracket 108 of the head restraint 22. The second end 160 of the lever 156 is pivotally coupled to a link 166 which in turn is pivotally coupled to the middle portion 134 of the release arm 128. As the seat cushion 12 moves from the seating position to the stand-up position the first tab 154 moves relative to the second tab 154 pulling the second cable assembly 146, thereby actuating the head restraint 22 from the upright position to the stowed position.

In operation, the seat assembly 10 is normally in the seating position with the head restraint 22 in the operative position, as shown in FIG. 1. The track mechanisms 24 can be selectively manipulated by lifting the towel bar 104 to provide fore and aft sliding adjustment of the seat assembly 10. The recliner mechanisms 64 can be selectively manipulated to provide angular adjustment of the seat back 16 relative to the seat cushion 12.

When it is desired to have access to an area behind the seat assembly 10, the strap 94 is manipulated to actuate the release handle 92, or the release lever is actuated, thereby actuating the floor latches 90 from the latched position to the unlatched position. In this condition, the torsion springs 50 urge the seat cushion 12 to pivot upwardly and forwardly about the main pivot pins 46. The movement of the support brackets 36 relative to the base plates 48 pulls the second cable assembly 146, which causes the lever 156 to pivot in a clockwise direction (when viewed from FIG. 4). The pivotal movement of the lever 156 forces the link 166 upward, which causes the release arm 128 to rotate from the initial position to the rotated position, thereby actuating the head restraint 22 to the stowed position. At the same time, the drive link 82 pulls downward on the rearward rod 70, which urges the hinge assemblies 58 to rotate in the clockwise direction (when viewed from FIG. 1) about pivots 68. The upwardly and forwardly movement of the support brackets 36 and the rotational movement of the hinge assemblies 58 cause the seat back lock mechanisms 74 to move such that the cam surface 80 releases the rearward rod 70. As the seat cushion 12 pivots upwardly and forwardly the rearward rod 70 travels within the arcuate slots 44 until the seat back 16 is in the second vertical position.

The seat cushion 12 is in the stand-up position when the seat cushion 12 and seat back 16 are generally vertically aligned, as shown in FIG. 2. The center of gravity of the seat assembly 10 is slightly over center of the main pivot pins 46 ensuring the seat assembly 10 is relatively stable in this position. A lock-out mechanism (not shown) may be included to selectively lock the seat cushion 12 in the stand-up position.

To return the seat cushion 12 to the seating position, the seat back 16 or seat cushion 12 is pushed rearwardly and downwardly. The drive link 82 now pushes upward on the rearward rod 70, which urges the hinge assemblies 58 to rotate in a counterclockwise direction (when viewed from FIG. 2) about pivots 68. The rearward rod 70 travels within the arcuate slots 44 until the cam surface 80 lockingly re-engages the rearward rod 70, locking the seat back lock mechanisms 74 and preventing the seat back 16 from pivoting relative to the seat cushion 12.

Figure 6:
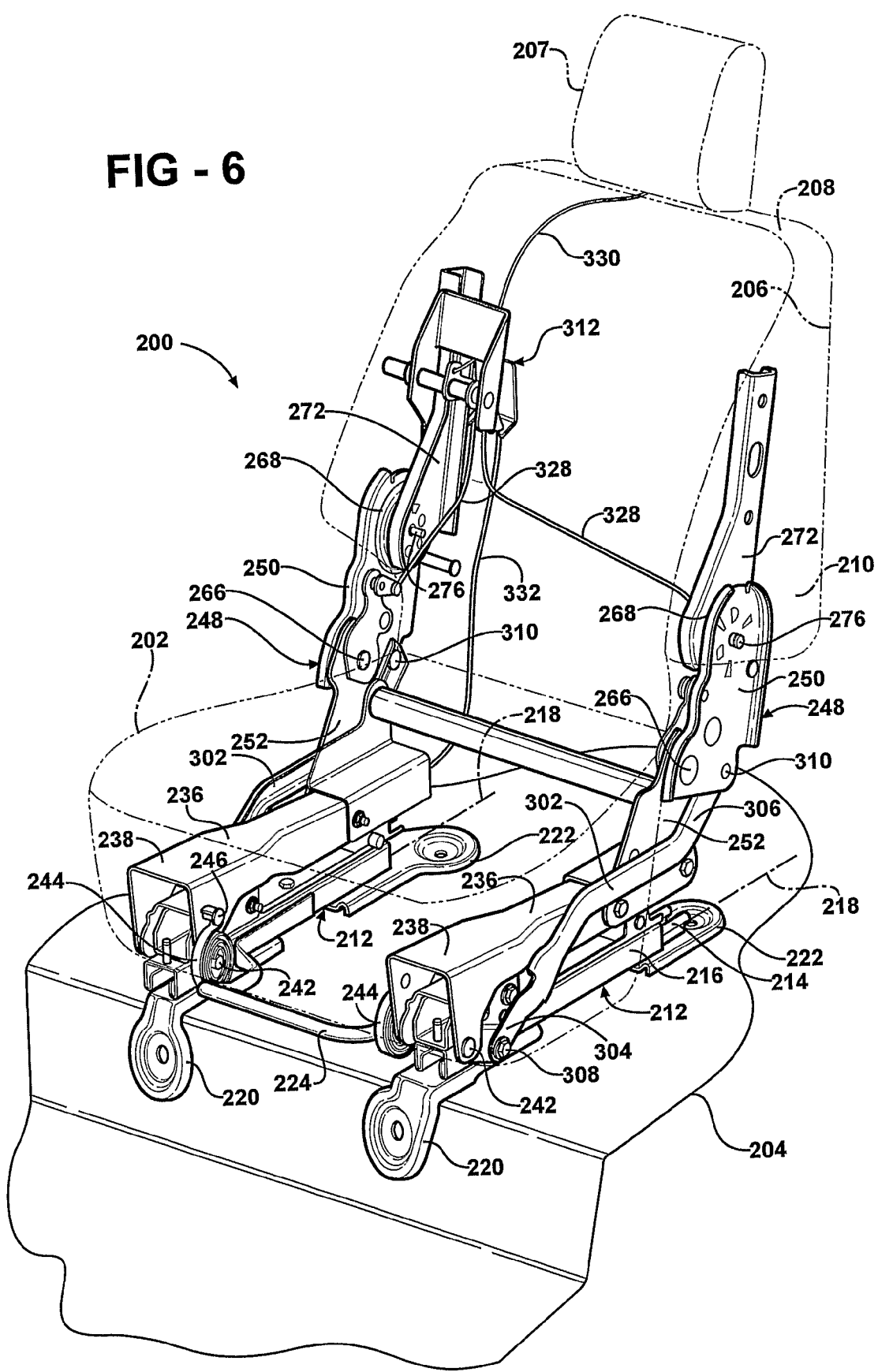
FIG. 6 is a perspective view of a second embodiment of the seat assembly in the seating position.
Figure 7:
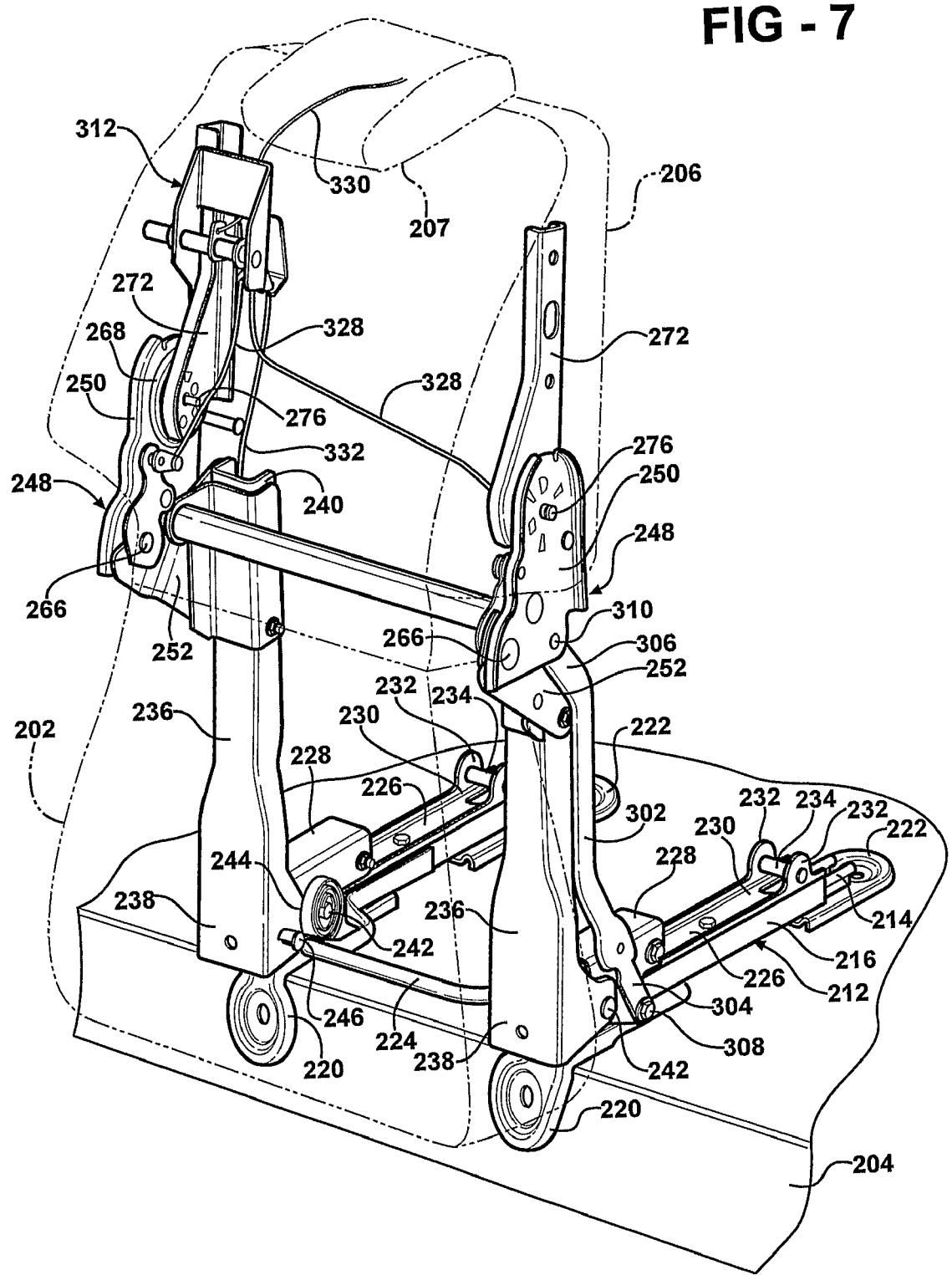
FIG. 7 is a perspective view of the second embodiment of the seat assembly in the stand-up position.

Referring to FIGS. 6 through 10, in a second embodiment of the invention a seat assembly is generally shown at 200. Referring to FIGS. 6 and 7, the seat assembly 200 includes a generally horizontal seat cushion 202 for supporting a seat occupant above a floor 204 in the vehicle. The seat cushion 202 includes a contoured foam pad (not shown) encased by a trim cover (not shown) and supported by a seat-pan (not shown). The seat assembly 200 also includes a seat back 206 extending between an upper end 208 and a lower end 210 operatively coupled to the seat cushion 202. The seat back 206 includes a contoured foam pad (not shown) encased by a trim cover (not shown).

The seat assembly 200 further includes a head restraint 207 operatively coupled to the upper end 208 of the seat back 206, as described above with respect to the first embodiment. The head restraint 207 is moveable between an operative or upright position, extending generally vertically from the seat back 206, and a stowed or forwardly folded position, at a transverse angle from the seat back 206.

A pair of laterally spaced apart track mechanisms, generally indicated at 212, is provided for adjusting the seat assembly 200 fore and aft. The track mechanisms 212 include a fixed track 214 and a moveable track 216 slidably engaging the fixed track 214. The fixed 214 and moveable 216 tracks define a longitudinal axis 218. The moveable tracks 216 are slidably adjustable relative to the fixed tracks 214 along the longitudinal axis 218. The fixed tracks 214 are fixedly secured to forward floor mounts 220 and rearward floor mounts 222, which in turn are fixedly secured to the floor 204.

A towel bar 224 disposed between the track mechanisms 212 extends laterally therebetween. The towel bar 224 extends forwardly from the track mechanisms 212, below the seat cushion 202. The towel bar 224 is operatively coupled to the track mechanisms 212 such that upward movement of the towel bar 224 will unlatch the moveable tracks 216 from the fixed tracks 214 to allow fore and aft sliding adjustment of the seat assembly 200.

Referring to FIG. 7, a striker bracket 226, is fixedly secured to the moveable track 216 of each track mechanism 212. Each striker bracket 226 extends between a forward end 228 and a rearward end 230. The rearward end 230 of each striker bracket 226 includes a pair of laterally spaced apart tabs 232, extending upwardly, having a striker bar 234 extending therebetween.

Referring to FIGS. 6 and 7, a pair of support brackets 236 extend between a forward end 238 and a rearward end 240. The seat-pan for supporting the seat cushion 202 is fixedly secured to the support brackets 236. The forward end 238 of each support bracket 236 is pivotally coupled by a main pivot pin 242 to the forward end 228 of the respective striker bracket 226. The seat cushion 202 pivots about the main pivot pins 242 between a seating position, shown in FIG. 6, and a stand-up position, shown in FIG. 7. A torsion spring 244 extends between each of the main pivot pins 242 and a post 246 (one shown) fixedly secured to the forward end 238 of each support bracket 236. The torsion springs 244 urge the support brackets 236, and therefore the seat cushion 202, to pivot forwardly and upwardly about the main pivot pins 242.

Figure 9:
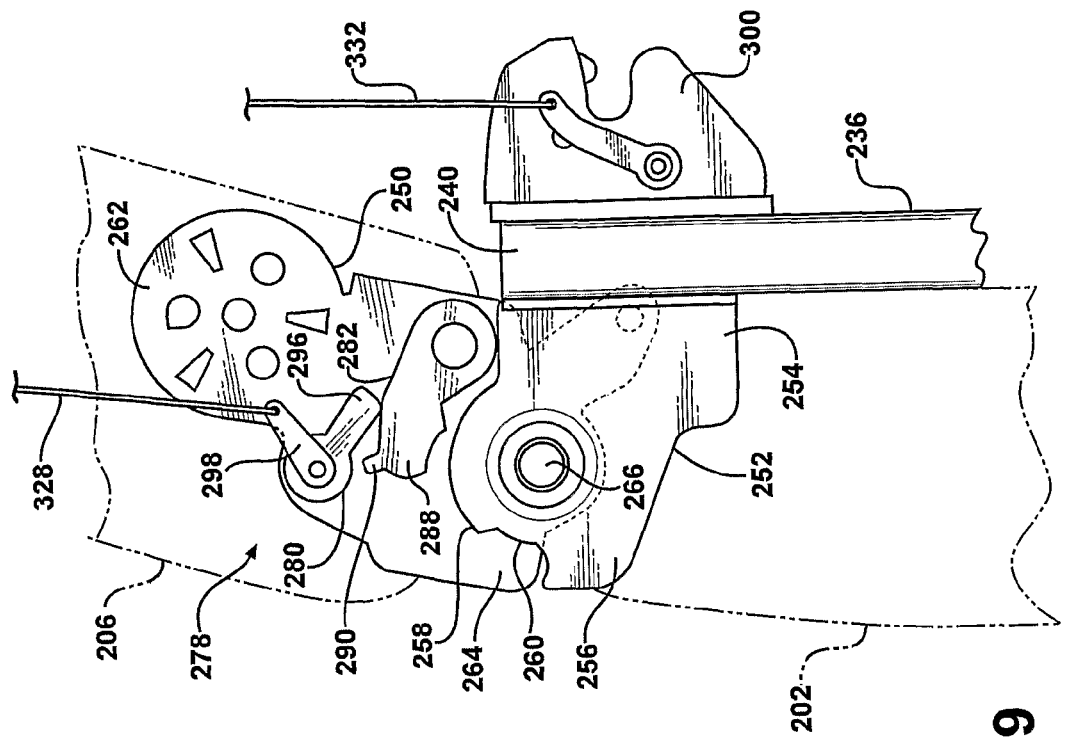
FIG. 9 is a fragmentary, enlarged side view of the second embodiment of the seat assembly showing the seat back lock mechanism in an unlocked condition.
Figure 8:
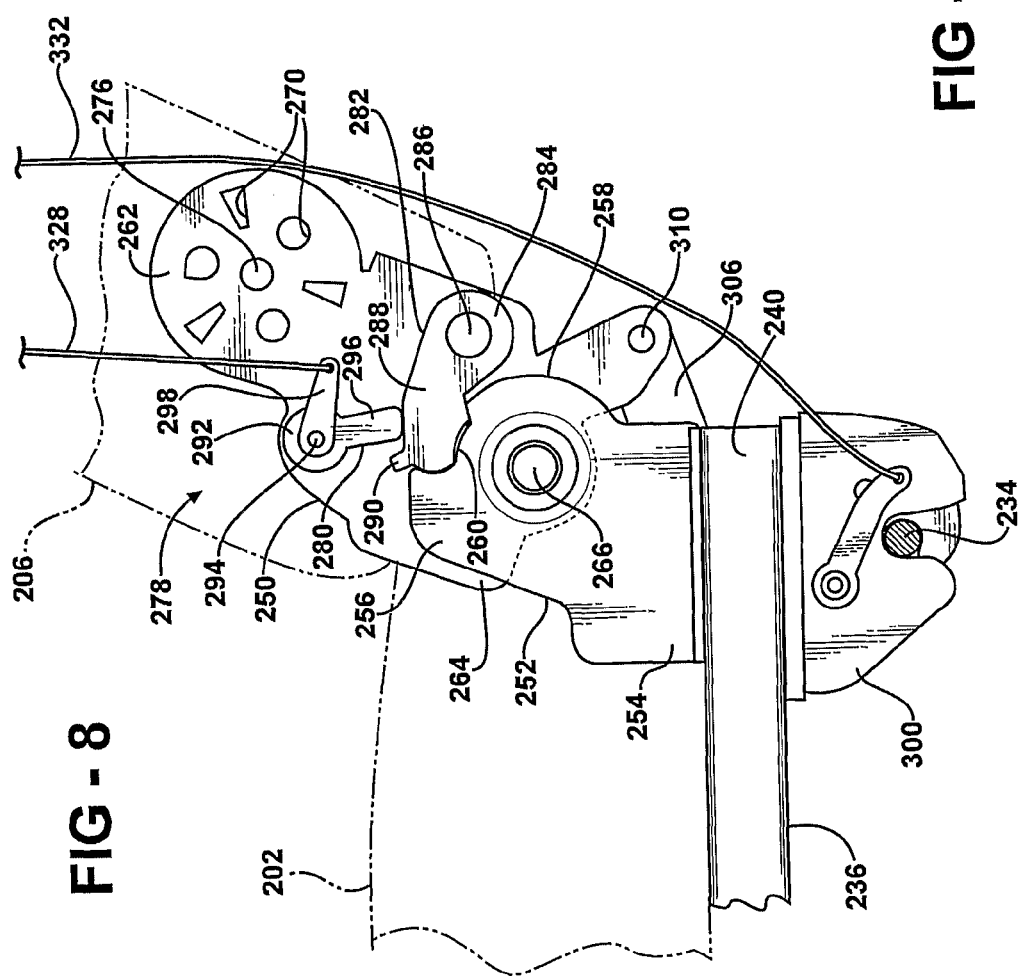
FIG. 8 is a fragmentary, enlarged side view of the second embodiment of the seat assembly showing a seat back lock mechanism in a locked condition.

A pair of hinge assemblies, generally indicated at 248, operatively coupling the seat back 206 to the seat cushion 202 is provided for pivoting the seat back 206 between a first vertical position, as shown in FIG. 6, when the seat cushion 202 is in the seating position and a second vertical position, forward and upward of the first vertical position, as shown in FIG. 7, when the seat cushion 202 is in the stand-up position. Each hinge assembly 248 includes a seat back bracket 250 pivotally coupled to a seat cushion bracket 252. Referring to FIGS. 8 and 9, the seat cushion bracket 252 of each hinge assembly 248 extends between a first end 254 and a second end 256. The first end 254 is fixedly secured to the rearward end 240 of the respective support bracket 236. The second end 256 includes a cam surface defined by a radial outer edge 258 having a notch 260 defined therein.

The seat back bracket 250 of each hinge assembly 248 extends between an upper end 262 and a lower end 264. The lower end 264 is pivotally coupled to the second end 256 of the respective seat cushion bracket 252 at pivot 266. The upper end 262 is operatively coupled to the lower end 210 of the seat back 206. More specifically, the upper end 262 is adapted to receive a recliner mechanism 268, shown in FIG. 6.

In the preferred embodiment, the upper end 262 includes a series of apertures 270 that complimentarily fit with embossments on the recliner mechanism 268. The recliner mechanism 268 is disposed between the upper end 262 of the seat back bracket 250 and a frame member 272 of the seat back 206, as shown in FIG. 6. The recliner mechanism 268 includes a recliner shaft 276 that is biased in an unreleased position such that the recliner mechanism 268 is normally in a locked state. The recliner shaft 276 is rotatably moveable from the unreleased position to a released position to actuate the recliner mechanism 268 to an unlocked state. In the unlocked state, the recliner mechanism 268 allows for selective angular adjustment of the seat back 206 relative to the seat cushion 202 about the recliner shaft 276. In addition, a recliner cross-talk tube 275 extends between the recliner shafts 276 of each recliner mechanism 268 such that the recliner mechanisms 268 are ganged together for cooperative operation and actuate between the locked and unlocked states, simultaneously.

Referring to FIGS. 8 and 9, each hinge assembly 248 also includes a seat back lock mechanism, generally shown at 278, for locking the seat back bracket 250 relative to the seat cushion bracket 252, thereby preventing the seat back 206 from pivoting between the first vertical position and the second vertical position. Each seat back lock mechanism 278 includes a cam 280 and pawl 282. The pawl 282 extends between a proximal end 284 pivotally coupled to the seat back bracket 250 via a pawl rivet 286 and a free distal end 288 for selectively engaging the notch 260 defined in the cam surface of the radial outer edge 258 of the seat cushion bracket 252. The distal end 288 of the pawl 282 includes a tooth 290. When the seat back 206 is in the first vertical position, the distal end 288 of the pawl 282 engages the notch 260 such that the seat back bracket 250 is locked relative to the seat cushion bracket 252.

The cam 280 extends between a proximal end 292 pivotally coupled to the seat back bracket 250 via a cam rivet 294 and a free distal end 296 for selectively engaging the tooth 290 at the distal end 288 of the pawl 282. The cam 280 pivots between a cam engaged position, shown in FIG. 8, with the distal end 296 abutting the tooth 290, and a cam released position, shown in FIG. 9, with the distal end 296 away from the tooth 290, allowing the pawl 282 to release from the notch 260. A cam spring (not shown) biases the cam 280 to the cam engaged position. A cam lever 298 is fixedly secured to the cam rivet 294 for actuating the cam 280 from the cam engaged position to the cam released position.

A pair of conventional floor latches 300, is provided for selectively locking the seat cushion 202 in the seating position. The floor latches 300 are fixedly secured to the rearward ends 240 of the support brackets 236 and are positioned to engage the striker bars 234. The floor latches 300 actuate between a latched position secured to the striker bars 234 and an unlatched position released from the striker bars 234. Additionally, a floor latch cross-talk tube (not shown) extends between the floor latches 300 such that they actuate from the latched position to the unlatched position, simultaneously.

Referring to FIGS. 6 and 7, a pair of drive links 302 is provided for guiding the seat back 206 between the first vertical position and the second vertical position as the seat cushion 202 moves between the seating position and the stand-up position. Each drive link 302 extends between a first end 304 and a second end 306. The first end 304 of each drive link 302 is pivotally coupled at pivot 308 to the forward end 228 of the respective striker bracket 226, rearwardly and downwardly of the main pivot pin 242. The second end 306 of each drive link 302 is pivotally coupled at pivot 310 to the lower end 264 of the respective seat back bracket 250, rearwardly and downwardly of pivot 266.

Figure 10:
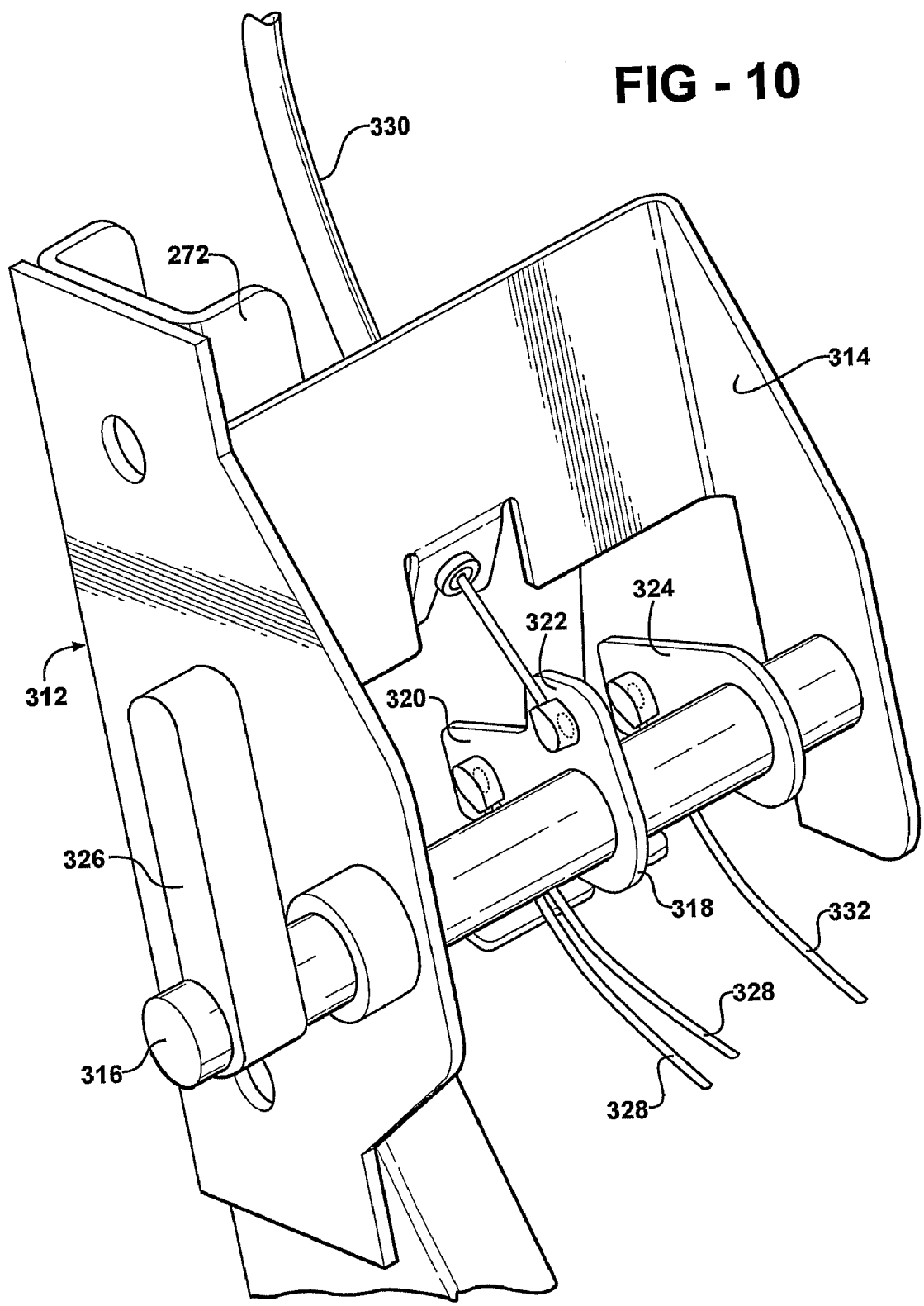
FIG. 10 is an enlarged perspective view of a release handle module for actuating the second embodiment of the seat assembly between the seating and stand-up positions.

Referring to FIG. 10, a release handle module, generally indicated at 312, is provided for actuating the seat cushion 202 between the seating position and the stand-up position. The release handle module 312 includes a mounting bracket 314 adapted to be fixedly secured to one of the frame members 272 of the seat back 206. The release handle module 312 also includes a shaft 316 rotatably coupled to the mounting bracket 314. The shaft 316 includes a first cable lever 318, having a first 320 and second 322 end, and a second cable lever 324 fixedly secured thereto. A release handle 326 is fixedly secured to the shaft 316 alongside the frame member 272.

A pair of first Bowden-type cable assemblies 328 extend between and operatively couple the release handle 326 and the seat back lock mechanisms 278. More specifically, each of the first cable assemblies 328 extend between the first end 320 of the first cable lever 318 and the cam lever 298 of the seat back lock mechanism 278. Actuating the release handle 326 pulls both cable assemblies 328 such that the cam levers 298 pivot, moving the cams 280 from the cam engaged position to the cam released position.

A second Bowden-type cable assembly 330 extends between and operatively couples the release handle 326 and the head restraint 207. More specifically, the second cable assembly 330 extends between the second end 322 of the first cable lever 318 and the head restraint 207. Actuating the release handle 326 pulls the cable assembly 330 such that the head restraint moves from the upright position to the stowed position.

A third Bowden-type cable assembly 332 extends between and operatively couples the release handle 326 and the floor latches 300. More specifically, the third cable assembly 332 extends between the second cable lever 324 and one of the floor latches 300. Actuating the release handle 326 pulls the cable assembly 332 such that the floor latches 300 actuate from the latched position to the unlatched position.

In operation, the seat assembly 200 is normally in the seating position with the head restraint in the upright position, as shown in FIG. 6. The track mechanisms 212 can be selectively manipulated by lifting the towel bar 224 to provide fore and aft sliding adjustment of the seat assembly 200 along the longitudinal axis 218. The recliner mechanisms 268 can be selectively manipulated to provide angular adjustment of the seat back 206 relative to the seat cushion 202 about the recliner shafts 276.

When it is desired to have access to or increase the cargo space behind the seat assembly 200, the release handle 326 is actuated. Actuating the release handle 326 forward causes the shaft 316, and therefore the first 318 and second 324 cable levers to rotate in a clockwise direction (when viewed from FIG. 10). The first end 320 of the first cable lever 318 pulls the first cable assemblies 328 such that the cam levers 298 pivot in a counterclockwise direction (when viewed from FIG. 8). The counterclockwise movement of the cam levers 298 cause each cam 280 to pivot from the cam engaged position to the cam released position, such that the distal end 296 of each cam 280 is away from the tooth 290 of each pawl 282. With the cams 280 in the cam released position, the distal end 288 of each pawl 282 releases from the respective notch 260 unlocking the seat back lock mechanisms 278 and allowing the seat back 206 to pivot about pivots 266. At the same time, the second end 322 of the first cable lever 318 pulls the second cable assembly 330 such that the head restraint 207 moves from the upright position to the stowed position.

The second cable lever 324 is oriented such that it pulls the third cable assembly 332 momentarily after the seat back lock mechanisms 278 unlock and the head restraint 207 moves to the stowed position. Pulling the third cable assembly 324 causes the floor latches 300 to actuate from the latched position to the unlatched position thereby releasing the striker bars 234. The torsion springs 244 urge the seat cushion 202 to pivot upwardly and forwardly about the main pivot pins 242 to a neutral position where the floor latches 300 are slightly above the striker bars 234. As the seat cushion 202 continues to pivot about the main pivot pins 242, the drive links 302 pull downward on the lower ends 264 of the seat back brackets 250 such that the seat back 206 pivots in the clockwise direction (when viewed from FIG. 6), thereby guiding the seat back 206 from the first vertical position to the second vertical position.

The seat cushion 202 is in the stand-up position when the seat cushion 202, seat back 206, and drive links 302 extend generally vertical from the floor 204. The center of gravity of the seat assembly 200 is slightly over center of the main pivot pins 242 ensuring the seat assembly 200 is relatively stable in this position. A lock-out mechanism (not shown) may be included to selectively lock the seat cushion 202 in the stand-up position.

To return the seat cushion 202 to the seating position, the seat back 206 is pushed rearwardly and downwardly. The drive links 302 now push upward on the lower ends 264 of the seat back brackets 250 such that the seat back 206 pivots in the counterclockwise direction (when viewed from FIG. 7), thereby guiding the seat back 206 from the second vertical position to the first vertical position. As the seat back 206 pivots in the counterclockwise direction the distal end 288 of each pawl 282 travels along the cam surface of the radial outer edge 258 of the respective seat cushion bracket 252 until it re-engages the respective notch 260. The cam springs then bias the cams 280 from the cam released position to the cam engaged position, such that the distal end 296 of each cam 280 is abutting the tooth 290 of each pawl 282, locking the seat back lock mechanisms 278 and preventing the seat back 206 from pivoting relative to the seat cushion 202.

The seat back lock mechanisms 278 lock prior to the floor latches 300 re-latching to the striker bars 234. Thus, the continued movement of the seat cushion 202 toward the seating position preloads the seat back lock mechanisms 278 by compressing the drive links 302. The drive links 302 transfer this compressive force to the seat back brackets 250, by urging the seat back brackets 250 to pivot in the counterclockwise direction, which results in the cams 280 forcing the pawls 282 into the respective notch 260. The seat cushion 202 continues to pivot about the main pivot pins 242 until the floor latches 300 re-latch to the striker bars 234.

Figure 11:
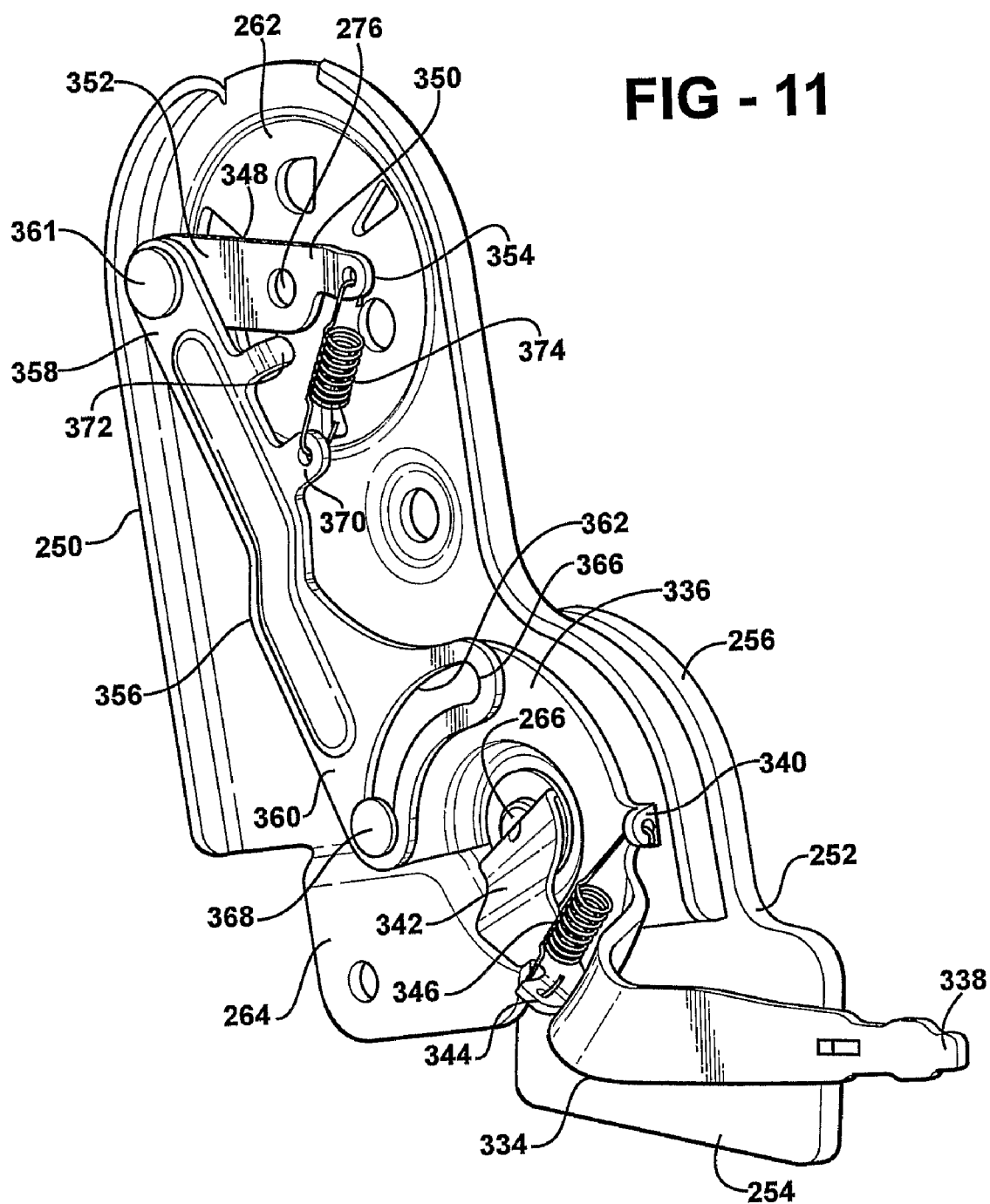
FIG. 11 is an enlarged perspective view of a recliner handle in a rest position.
Figure 12:
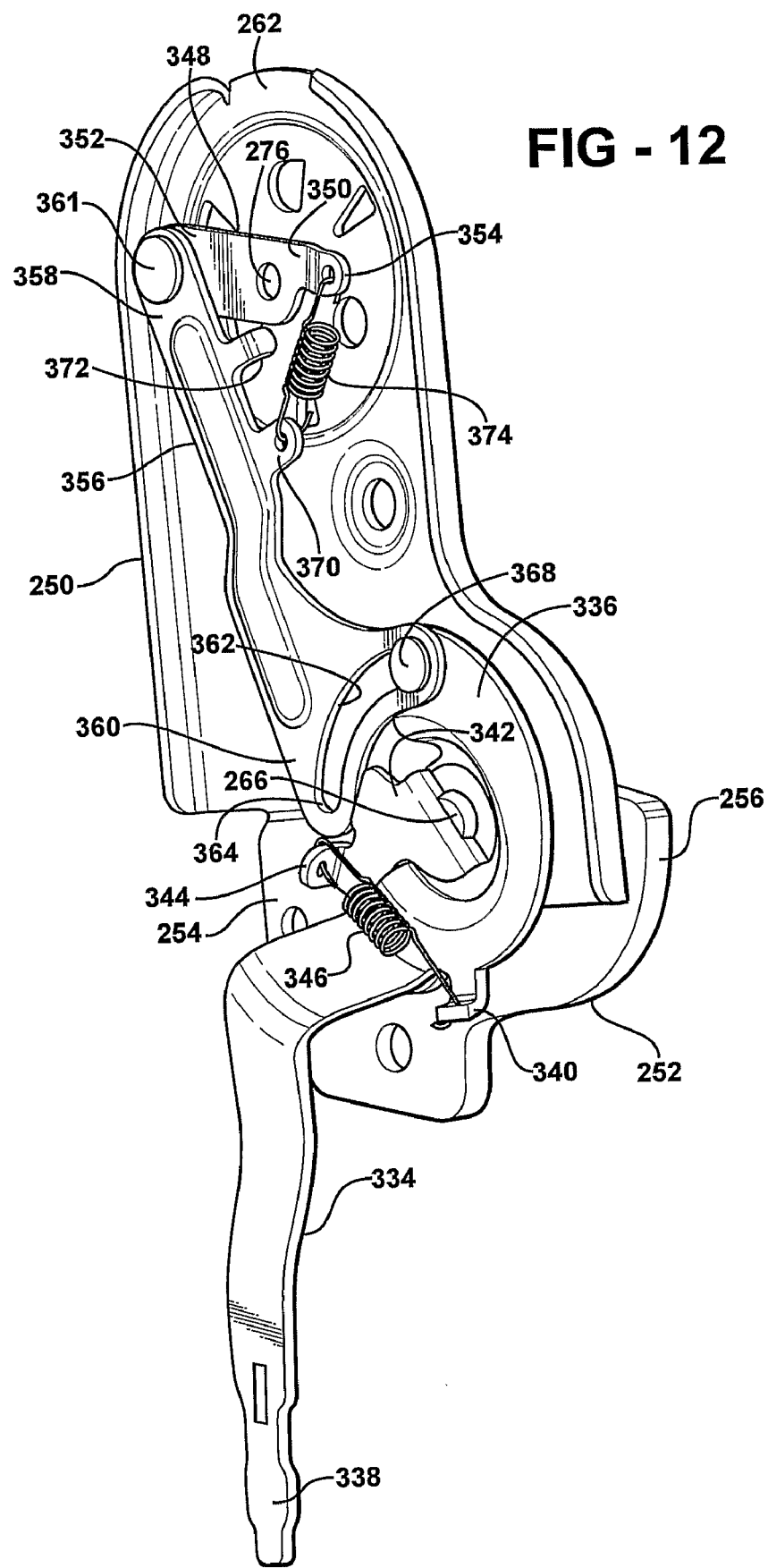
FIG. 12 is and enlarged perspective view of the recliner handle in an actuated position.

Referring to FIGS. 11 and 12, the seat assembly 200 may include a recliner handle 334 operatively coupled to one of the recliner shafts 276 for actuating the recliner mechanisms 268 between the locked and unlocked states. The recliner handle 334 extends between a proximal end 336 and a free distal end 338. The proximal end 336 is pivotally coupled to the lower end 264 of the seat back bracket 250 at pivot 266. The recliner handle 334 pivots between a rest position, shown in FIG. 11, such that the recliner mechanisms 268 are in the locked state and an actuated position, shown in FIG. 12, such that the recliner mechanisms 268 are in the unlocked state. The recliner handle 334 includes an integrally formed tab 340.

A plate 342 is fixedly secured at pivot 266 relative to the seat cushion bracket 252 such that the plate 342 does not pivot with the seat back bracket 250 during angular adjustment of the seat back 206. The plate 342 includes an integrally formed tab 344. A first spring 346 extending between the tab 340 of the recliner handle 334 and the tab 344 of the plate 342 biases the recliner handle 334 to the rest position.

A release link 348 extends between a first end 350 and a second end 352. The first end 350 of the release link 348 is fixedly secured to the recliner shaft 276. The release link 348 includes an integrally formed tab 354 at the first end 350. The release link 348 pivots about the first end 350 to rotate the recliner shaft 276 between the unreleased and released positions, thereby actuating the recliner mechanisms 268 between the locked and unlocked states.

A recliner link 356 extends between an upper end 358 and a lower end 360 interconnecting the release link 348 and the recliner handle 334. The upper end 358 of the recliner link 356 is pivotally coupled at 361 to the second end 352 of the release link 348. The lower end 360 of the recliner link 356 includes an arcuate slot 362 extending between a first end 364 and a second end 366. A guide pin 368 fixedly secured to the proximal end 336 of the recliner handle 334 is disposed within the arcuate slot 362 pivotally and slidably coupling the lower end 360 of the recliner link 356 to the recliner handle 334. The recliner handle 334 thus has a lost motion connection. The recliner link 356 includes an integrally formed tab 370 and stop 372 disposed between the upper 358 and lower 360 ends. A second spring 374 extends between the tab 370 of the recliner link 356 and the tab 354 at the first end 350 of the release link 348. The second spring 374 biases the recliner link 356 and release link 348 together such that the stop 372 abuts the release link 348 when the recliner handle 334 is in the rest position, thereby preventing unwanted rattling of the recliner link 356 and release link 348.

In operation, the seat cushion 202 is normally in the seating position, with the recliner handle 334 in the rest position and the guide pin 368 disposed at the first end 364 of the arcuate slot 362. When it is desired to angularly adjust the seat back 206 the distal end 338 of the recliner handle 334 is lifted. Lifting the distal end 338 of the recliner handle 334 pivots the recliner handle 334 in the counterclockwise direction (when viewed from FIG. 11). The pivotal movement of the recliner handle 334 causes the guide pin 368 to pull the recliner link 356 downward. The downward movement of the recliner link 356 causes the release link 348 to pivot in the counterclockwise direction. The pivotal movement of the release link 348 rotates the recliner shaft 276 from the unreleased position to the released position, thereby actuating the recliner mechanisms 268 from the locked state to the unlocked state to allow angular adjustment of the seat back 206. After the seat back 206 is adjusted, the first spring 346 urges the recliner handle 334 back to the rest position and the second spring 374 urges the recliner link 356 and release link 348 together until the stop 372 abuts the release link 348.

Additionally, as the seat cushion 202 moves between the seating position and the stand-up position as described above, the recliner handle 334 maintains its position relative to the seat cushion 202 such that the distal end 338 does not protrude forwardly of the seat cushion 202. More specifically, as the seat back 206 moves from the first vertical position to the second vertical position the guide pin 368 travels within the arcuate slot 362 from the first end 364 to the second end 366. This allows the recliner handle 334 to maintain its position alongside the seat cushion 202.

Figure 13:
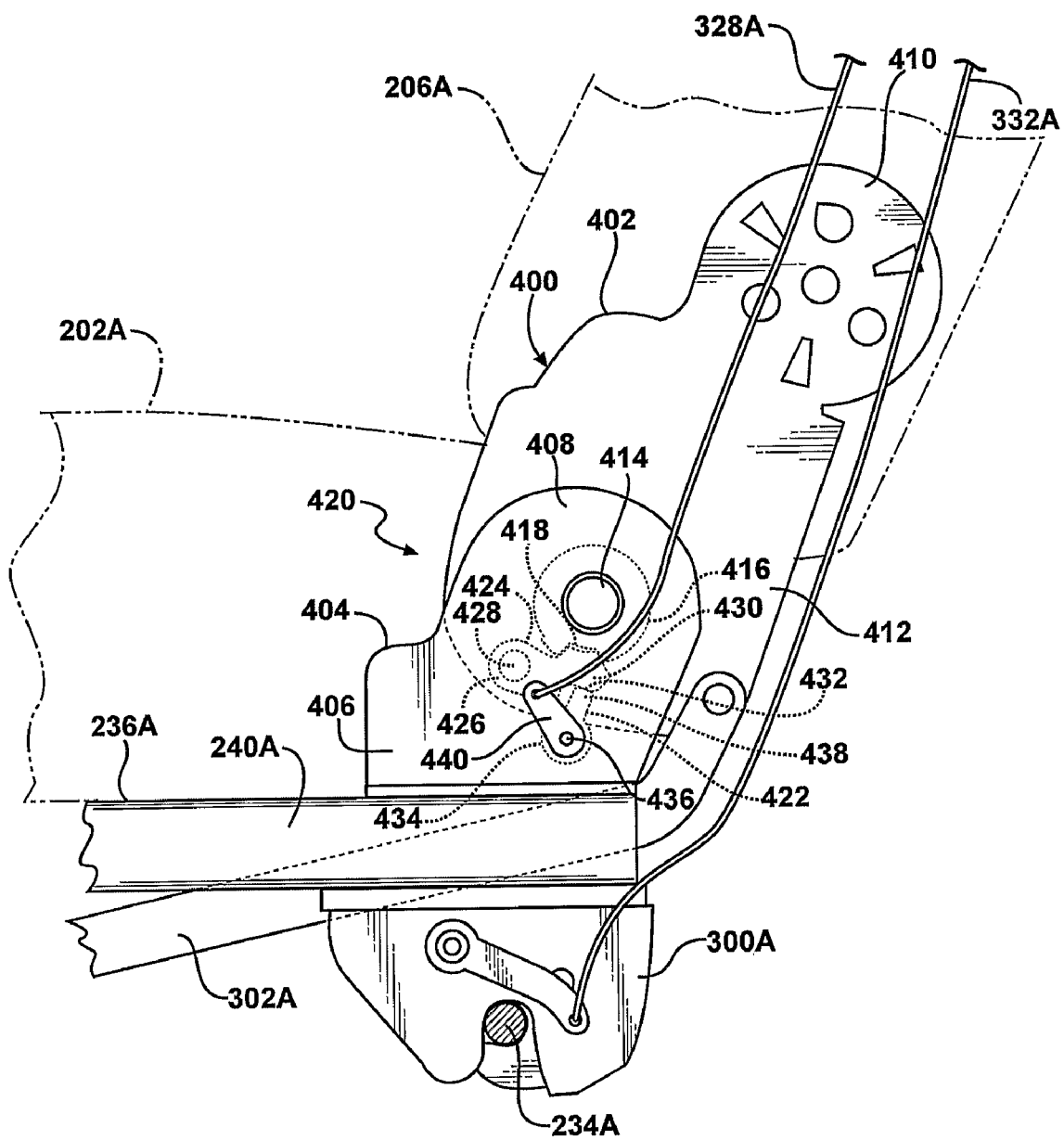
FIG. 13 is a fragmentary, enlarged side view of a third embodiment of the seat assembly showing a seat back lock mechanism in a locked condition.
Figure 14:
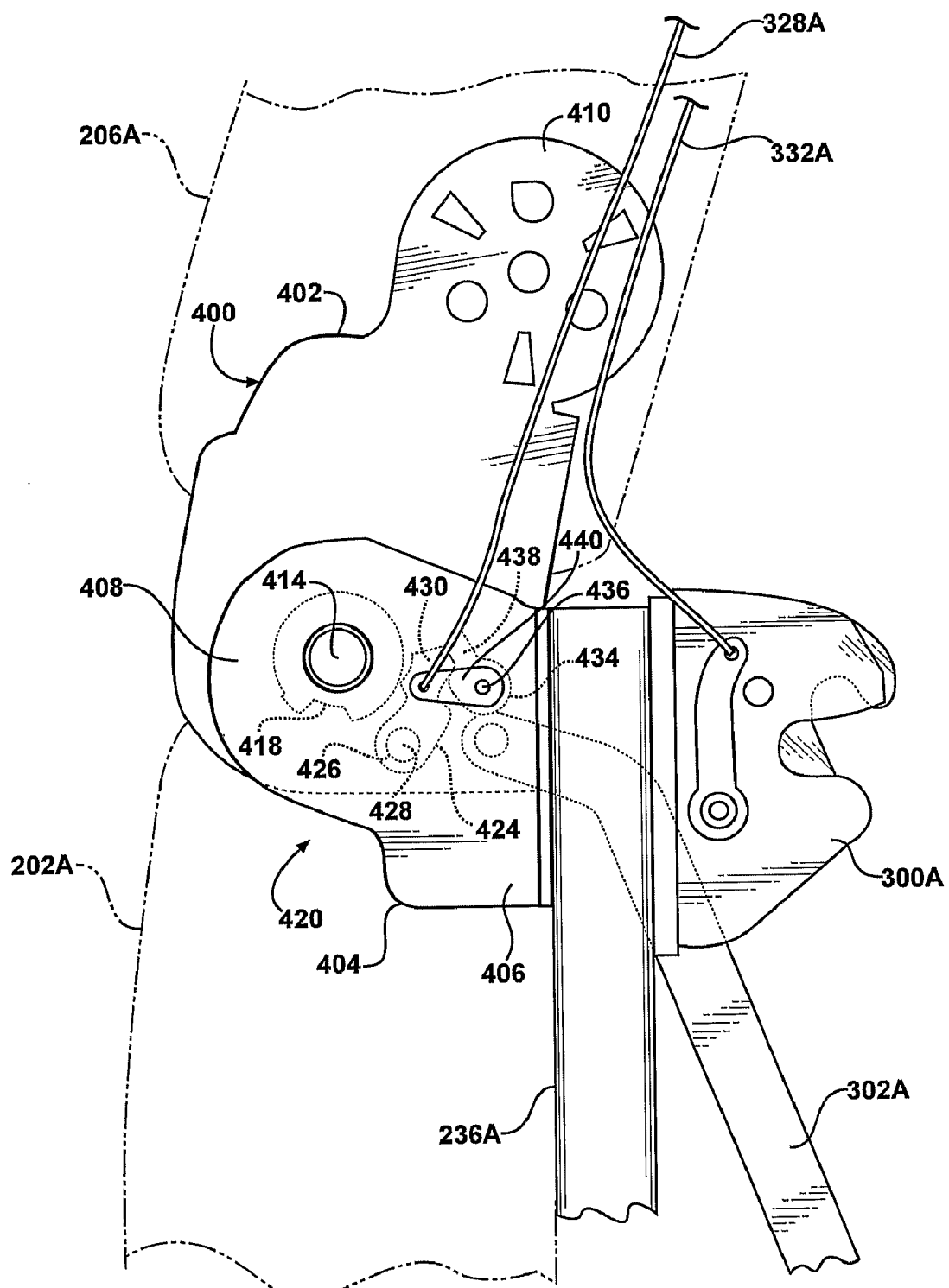
FIG. 14 is a fragmentary, enlarged side view of the third embodiment of the seat assembly showing the seat back lock mechanism in an unlocked condition.

Referring to FIGS. 13 and 14, wherein like reference numerals designated by the letter 'a' represent similar elements as those described above, in a third embodiment of the invention the seat assembly 200a includes a pair of hinge assemblies, generally indicated at 400. The pair of hinge assemblies 400 operatively coupling the seat back 206a to the seat cushion 202a is provided for pivoting the seat back 206a between the first vertical position, as shown in FIG. 13, and the second vertical position, as shown in FIG. 14. Each hinge assembly 400 includes a seat back bracket 402 pivotally coupled to a seat cushion bracket 404. The seat cushion bracket 404 of each hinge assembly 400 extends between a first end 406 fixedly secured to the rearward end 240a of the respective support bracket 236a and a second end 408.

The seat back bracket 402 of each hinge assembly 400 extends between an upper end 410 and a lower end 412. The upper end 410 is operatively coupled to the lower end 210a of the seat back 206a as described above. The lower end 412 is pivotally coupled to the second end 408 of the respective seat cushion bracket 404 at pivot 414. The lower end 412 also includes a cam surface defined by a radial edge 416 having a notch 418 defined therein.

Each hinge assembly 400 also includes a seat back lock mechanism, generally shown at 420, for locking the seat back bracket 402 relative to the seat cushion bracket 404, thereby preventing the seat back 206a from pivoting between the first vertical position and the second vertical position. Each seat back lock mechanism 420 includes a cam 422 and pawl 424. The pawl 424 extends between a proximal end 426 pivotally coupled to the seat cushion bracket 404 via a pawl rivet 428 and a free distal end 430 for selectively engaging the notch 418 defined in the cam surface of the radial edge 416 of the seat back bracket 402. The distal end 430 of the pawl 424 includes a recessed step 432. When the seat back 206a is in the seating position, the distal end 430 of the pawl 424 engages the notch 418 such that the seat back bracket 402 is locked relative to the seat cushion bracket 404.

The cam 422 extends between a proximal end 434 pivotally coupled to the seat cushion bracket 404 via a cam rivet 436 and a free distal end 438 for selectively engaging the recessed step 432 at the distal end 430 of the pawl 424. The cam 422 pivots between a cam engaged position with the distal end 438 abutting the recessed step 432 and a cam released position with the distal end 438 away from the recessed step 432, allowing the pawl 424 to release from the notch 418. A cam spring (not shown) biases the cam 422 to the cam engaged position. A cam lever 440 is fixedly secured to the cam rivet 436 for actuating the cam 422 from the cam engaged position to the cam released position.

In the third embodiment, the first cable assemblies 328a extend between the first end 320a of the first cable lever 318a and the cam levers 440. Actuating the release handle 326a pulls the first cable assemblies 328a such that the cam levers 440 pivot, moving the cams 422 from the cam engaged position to the cam released position.

In operation, when it is desired to have access to or increase the cargo space behind the seat assembly 200a, the release handle 326a is actuated. Actuating the release handle 326a forward causes the shaft 316a and therefore the first 318a and second 324a cable levers to rotate. The first end 320a of the first cable lever 318a pulls the first cable assemblies 328a such that the cam levers 440 pivot in the clockwise direction (when viewed from FIG. 13). The clockwise movement of the cam levers 440 causes each cam 422 to pivot from the cam engaged position to the cam released position, such that the distal end 438 of each cam 422 is away from the recessed step 432 of each pawl 424. With the cams 422 in the cam released position, the distal end 430 of each pawl 424 releases from the respective notch 418 unlocking the seat back lock mechanisms 420 and allowing the seat back 206a to pivot about pivots 414.

As described above with respect to the second embodiment, the second cable lever 324a is oriented such that it pulls the third cable assembly 332a momentarily after the seat back lock mechanisms 420 unlock. Pulling the third cable assembly 332a causes the floor latches 300a to actuate from the latched position to the unlatched position thereby releasing the striker bars 234a. The torsion springs 244a urge the seat cushion 202a to pivot upwardly and forwardly about the main pivot pins 242a to a neutral position where the floor latches 300a are slightly above the striker bars 234a. As the seat cushion 202a continues to pivot about the main pivot pins 242a, the drive links 302a pull downward on the lower ends 412 of the seat back brackets 402 such that the seat back 206a pivots in the clockwise direction (when viewed from FIG. 13), thereby guiding the seat back 206a from the first vertical position to the second vertical position.

The seat cushion 202a is in the stand-up position when the seat cushion 202a and seat back 206a are generally aligned.

The center of gravity of the seat assembly 200a is slightly over center of the main pivot pins 242a ensuring the seat assembly 200a is relatively stable in this position. A lock-out mechanism (not shown) may be included to selectively lock the seat cushion 202a in the stand-up position.

To return the seat cushion 202a to the seating position, the seat back 206a is pushed rearwardly and downwardly. The drive links 302a now push upward on the lower ends 412 of the seat back brackets 402 such that the seat back 206a pivots in the counterclockwise direction (when viewed from FIG. 14), thereby guiding the seat back 206a from the second vertical position to the first vertical position. As the seat back 206a pivots in the counterclockwise direction the distal end 430 of each pawl 424 travels along the cam surface of the radial edge 416 of the respective seat back bracket 402 until it re-engages the respective notch 418. The cam springs then bias the cams 422 from the cam released position to the cam engaged position, such that the distal end 438 of each cam 422 is abutting the recessed step 432 of each pawl 424, locking the seat back lock mechanisms 420 and preventing the seat back 206a from pivoting relative to the seat cushion 202a.

The seat back lock mechanisms 420 lock prior to the floor latches 300a re-latching to the striker bars 234a. Thus, the continued movement of the seat cushion 202a toward the seating position preloads the seat back lock mechanisms 420 by compressing the drive links 302a. The drive links 302a transfer this compressive force to the seat back brackets 402, which in turn forces the cams 422 against the pawls 424. The seat cushion 202a continues to pivot about the main pivot pins 242a until the floor latches 300a re-latch to the striker bars 234a.

Figure 16:
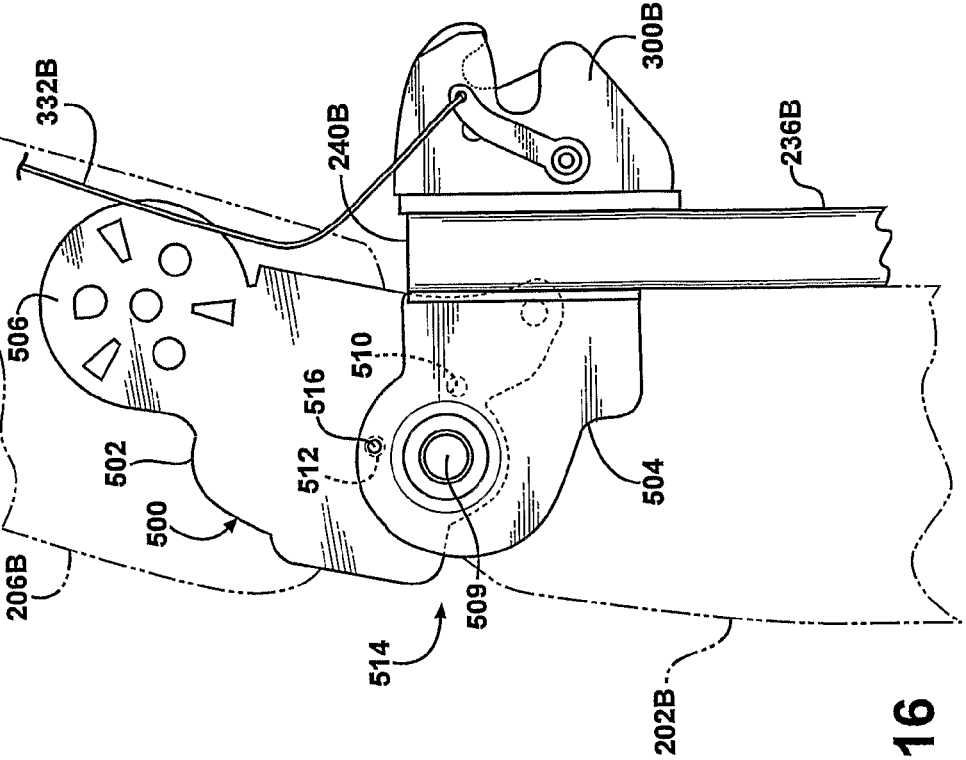
FIG. 16 is a fragmentary, enlarged side view of the fourth embodiment of the seat assembly showing the seat back lock mechanism in an unlocked condition.
Figure 15:
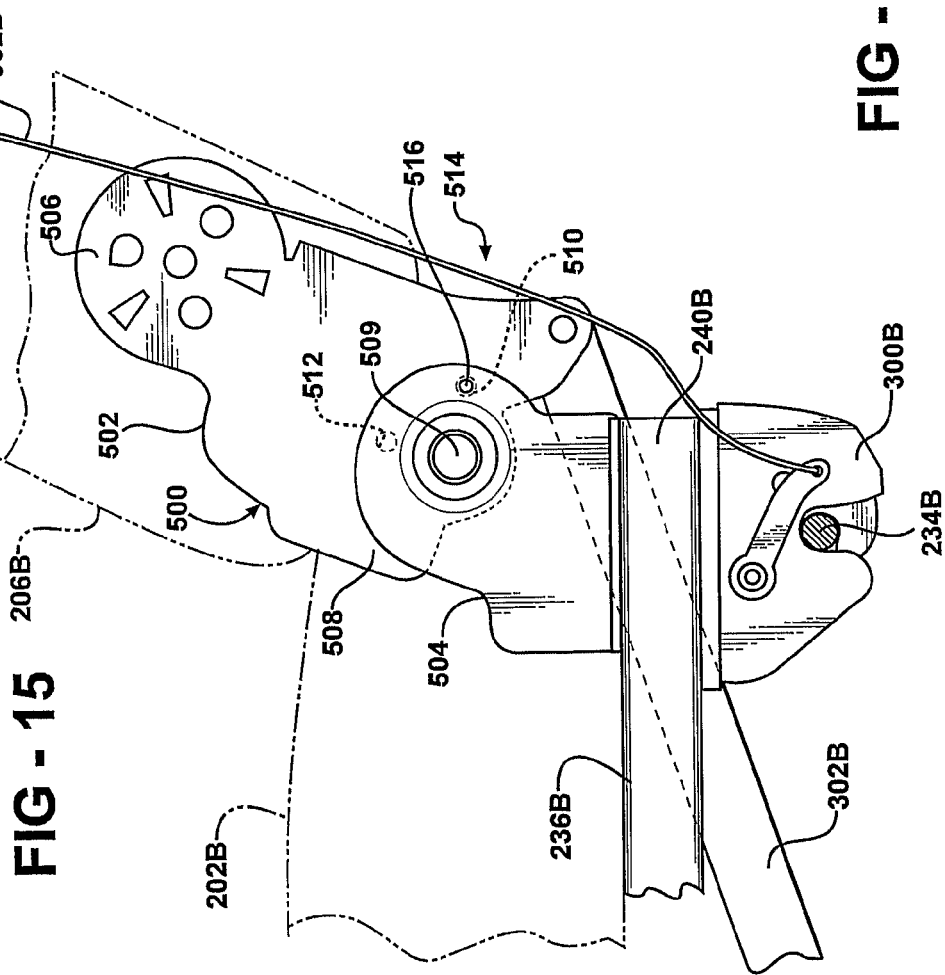
FIG. 15 is a fragmentary, enlarged side view of a fourth embodiment of the seat assembly showing a seat back lock mechanism in a locked condition.

Referring to FIGS. 15 and 16, wherein like reference numerals designated by the letter 'b' represent similar elements as those described above, in a fourth embodiment of the invention the seat assembly 200b includes a pair of hinge assemblies, generally indicated at 500. The pair of hinge assemblies 500 operatively coupling the seat back 206b to the seat cushion 202b is provided for pivoting the seat back 206b between the first vertical position, as shown in FIG. 15, and the second vertical position, as shown in FIG. 16. Each hinge assembly 500 includes a seat back bracket 502 pivotally coupled to a seat cushion bracket 504. The seat cushion bracket 504 of each hinge assembly 500 is fixedly secured to the rearward end 240b of the respective support bracket 236b.

The seat back bracket 502 of each hinge assembly 500 extends between an upper end 506 and a lower end 508. The upper end 506 is operatively coupled to the lower end 210b of the seat back 206b as described above. The lower end 508 is pivotally coupled to the respective seat cushion bracket 504 at pivot 509. The lower end 508 of at least one of the seat back brackets 502 includes a first hole 510 and a second hole 512 extending therethrough.

At least one of the hinge assemblies 500 also includes a seat back lock mechanism, generally shown at 514, for locking the seat back bracket 502 relative to the seat cushion bracket 504, thereby preventing the seat back 206b from pivoting between the first vertical position and the second vertical position. The seat back lock mechanism 514 includes a spring-loaded pin 516 extending laterally from the seat cushion bracket 504. The pin 516 is retractably coupled to the seat cushion bracket 504 for movement between an extended position and a retracted position. When the seat back 206b is in the first vertical position, the pin 516 is in the extended position disposed in the first hole 510 such that the seat back bracket 502 is locked relative to the seat cushion bracket 504.

In the fourth embodiment, the first cable assemblies 328b extend between the first end 320b of the first cable lever 318b and one of the pins 516. Actuating the release handle 326b pulls the first cable assemblies 328b moving the pins 516 to the retracted position, withdrawing them from the first holes 510, thereby unlocking the seat back lock mechanisms 514.

In operation, when it is desired to have access or increase the cargo space behind the seat assembly 200b, the release handle 326b is actuated. Actuating the release handle 326b forward causes the shaft 316b and therefore the first 318b and second 324b cable levers to rotate. The first end 320b of the first cable lever 318b pulls the first cable assemblies 328b moving the pins 516 to the retracted position. With the pins 516 in the retracted position, withdrawn from the first hole 510, the seat back lock mechanisms 514 are unlocked allowing the seat back 206b to pivot about pivots 509.

As described above with respect to the second embodiment, the second cable lever 324b is oriented such that it pulls the third cable assembly 332b momentarily after the seat back: lock mechanisms 514 unlock. Pulling the third cable assembly 332b causes the floor latches 300b to actuate from the latched position to the unlatched position thereby releasing the striker bars 234b. The torsion springs 244b urge the seat cushion 202b to pivot upwardly and forwardly about the main pivot pins 242b to a neutral position where the floor latches 300b are slightly above the striker bars 234b. As the seat cushion 202b continues to pivot about the main pivot pins 242b, the drive links 302b pull downward on the lower ends 508 of the seat back brackets 502 such that the seat back 206b pivots in the clockwise direction (when viewed from FIG. 15), thereby guiding the seat back 206b from the first vertical position to the second vertical position. When the seat back 206b is in the second vertical position, the pins 516 are in the extended position disposed through the second holes 512.

The seat cushion 202b is in the stand-up position when the seat cushion 202b and seat back 206b are generally aligned. The center of gravity of the seat assembly 200b is slightly over center of the main pivot pins 242b ensuring the seat assembly 200b is relatively stable in this position. A lock-out mechanism (not shown) may be included to selectively lock the seat cushion 202b in the stand-up position.

To return the seat cushion 202b to the seating position, the seat back 206b is pushed rearwardly and downwardly. The drive links 302b now push upward on the lower ends 508 of the seat back brackets 502 such that the seat back 206b pivots in the counterclockwise direction (when viewed from FIG. 16), thereby guiding the seat back 206b from the second vertical position to the first vertical position. When the pins 516 are re-aligned with the first holes 510 they automatically move to the extended position disposed through the first holes 510, locking the seat back lock mechanisms 514 and preventing the seat back 206b from pivoting relative to the seat cushion 202b.

The seat back lock mechanisms 514 lock prior to the floor latches 300b re-latching the striker bars 234b. Thus, the continued movement of the seat cushion 202b toward the seating position preloads the seat back lock mechanism 514 by compressing the drive links 302b. The drive links 302b transfer this compressive force to the seat back brackets 502 by urging the seat back brackets 502 to pivot in the counterclockwise direction, which results in the pins 516 loading against the first holes 510. The seat cushion 202b continues to pivot about the main pivot pins 242b until the floor latches 300b are in the latched position, secured to the striker bars 234b.

Figure 17:
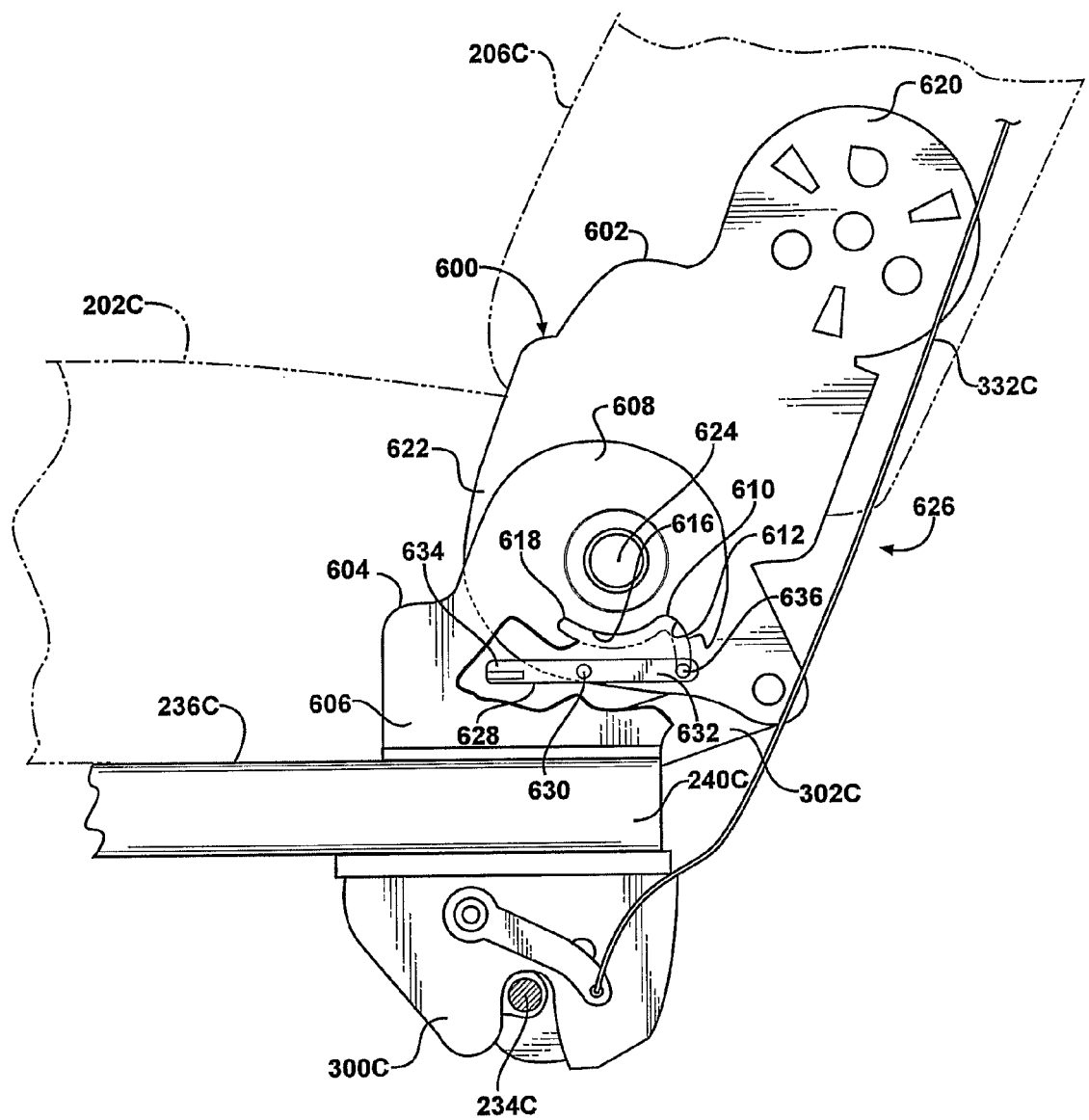
FIG. 17 is a fragmentary, enlarged side view of a fifth embodiment of the seat assembly showing a seat back lock mechanism in a locked condition.
Figure 18:
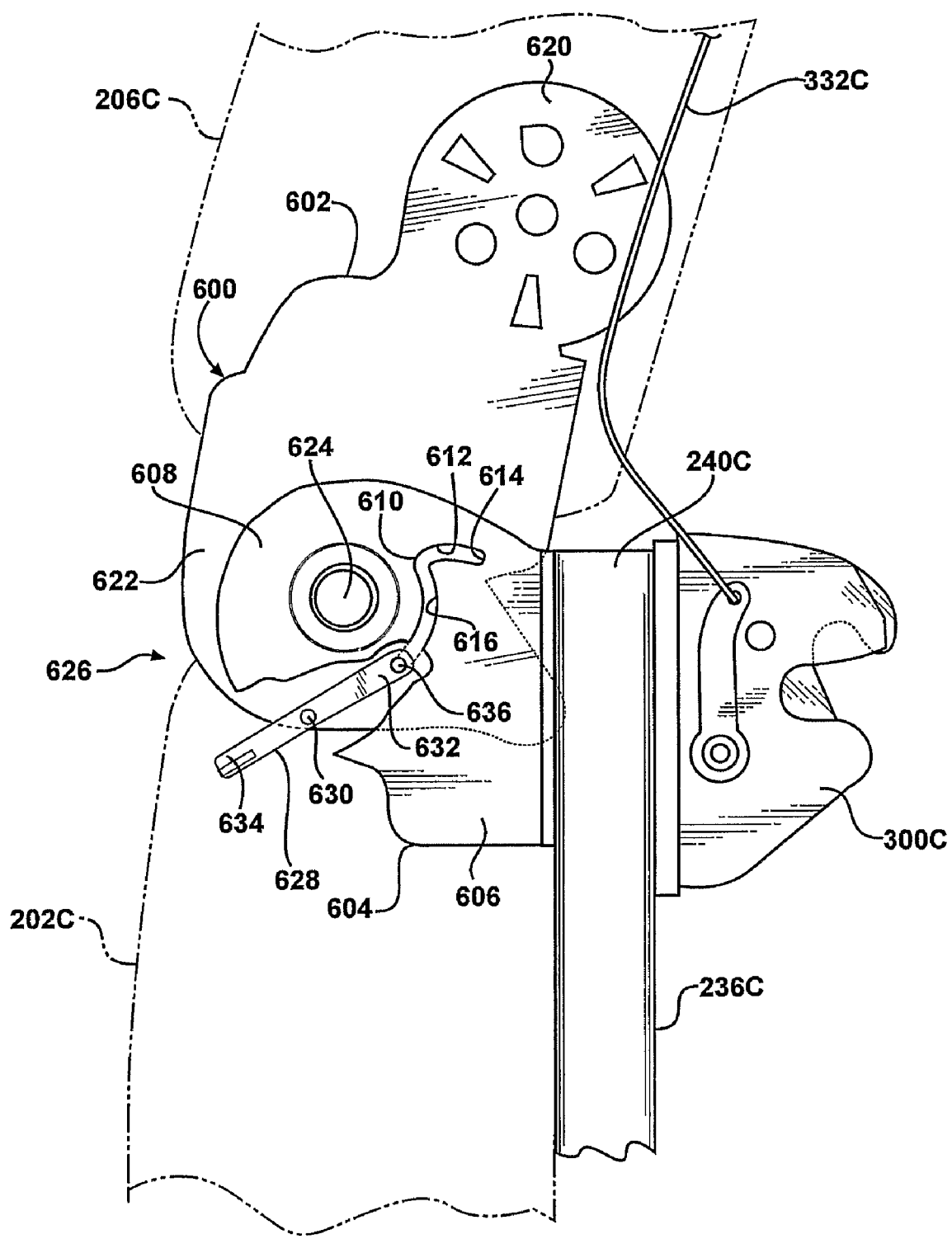
FIG. 18 is a fragmentary, enlarged side view of the fifth embodiment of the seat assembly showing the seat back lock mechanism in an unlocked condition.

Referring to FIGS. 17 and 18, wherein like reference numerals designated by the letter 'c' represent similar elements as those described above, in a fifth embodiment of the invention the seat assembly 200c includes a pair of hinge assemblies, generally indicated at 600. The pair of hinge assemblies 600 operatively coupling the seat back 206c to the seat cushion 202c is provided for pivoting the seat back 206c between the first vertical position, as shown in FIG. 17, and the second vertical position, as shown in FIG. 18. Each hinge assembly 600 includes a seat back bracket 602 pivotally coupled to a seat cushion bracket 604. The seat cushion bracket 604 of each hinge assembly 600 extends between a first end 606 fixedly secured to the rearward end 240c of the respective support bracket 236c and a second end 608. At least one of the seat cushion brackets 604 include an arcuate slot 610 extending therethrough. The arcuate slot 610 includes a generally vertical portion 612 (when viewed from FIG. 17) having a first end 614 and a generally horizontal portion 616 (when viewed from FIG. 17) having a second end 618.

The seat back bracket 602 extends between an upper end 620 and a lower end 622. The upper end 620 is operatively coupled to the lower end 210c of the seat back 206c as described above. The lower end 622 is pivotally coupled to the second end 608 of the seat cushion bracket 604 at pivot 624.

At least one of the hinge assemblies 600 also includes a seat back lock mechanism, generally shown at 626, for locking the seat back bracket 602 relative to the seat cushion bracket 604, thereby preventing the seat back 206c from pivoting between the first vertical position and the second vertical position. The seat cushion bracket 604 is partially cutaway to show a lever 628 pivotally coupled to the seat back bracket 602 at pivot 630. The lever 628 extends between a first end 632 and a second end 634. The first end 632 of the lever 628 includes a locking pin 636 extending laterally therefrom. When the seat back 206c is in the first vertical position, the locking pin 636 is disposed in the vertical portion 612 of the arcuate slot 610 at the first end 614 such that the seat back bracket 602 is locked relative to the seat cushion bracket 604.

In operation, when it is desired to have access to or increase the cargo space behind the seat assembly 200c, the second end 634 of the lever 628 is moved downward by actuating a cable (not shown) or by manually actuating the lever 628 to pivot the lever 628 counterclockwise (when viewed from FIG. 17). The counterclockwise rotation of the lever 628 moves the locking pin 636 from the vertical portion 612 to the horizontal portion 616 of the arcuate slot 610. With the locking pin 636 in the horizontal portion 616, the seat back lock mechanisms 626 are unlocked allowing the seat back 206c to pivot about pivots 624.

As described above with respect to the second embodiment, the second cable lever 324c is oriented such that it pulls the third cable assembly 332c momentarily after the seat back lock mechanisms 626 unlock. Pulling the third cable assembly 332c causes the floor latches 300c to actuate from the latched position to the unlatched position thereby releasing the striker bars 234c. The torsion springs 244c urge the seat cushion 202c to pivot upwardly and forwardly about the main pivot pins 242c to a neutral position where the floor latches 300c are slightly above the striker bars 234c. As the seat cushion 202c continues to pivot about the main pivot pins 244c, the drive links 302c pull downward on the lower ends 622 of the seat back brackets 602 such that the seat back 206c pivots in the clockwise direction (when viewed from FIG. 17), thereby guiding the seat back 206c from the first vertical position to the second vertical position. As the seat back 206c pivots the locking pin 636 travels along the horizontal portion 616 of the arcuate slot 610 toward the second end 618. When the seat back 206c is in the second vertical position, the locking pin 636 is disposed at the second end 618 of the arcuate slot 610.

The seat cushion 202c is in the stand-up position when the seat cushion 202c and seat back 206c are generally aligned. The center of gravity of the seat assembly 200c is slightly over center of the main pivot pins 242c ensuring the seat assembly 200c is relatively stable in this position. A lock-out mechanism (not shown) may be included to selectively lock the seat cushion 202c in the stand-up position.

To return the seat cushion 202c to the seating position, the seat back 206c is pushed rearwardly and downwardly. The drive links 302c now push upward on the lower ends 622 of the seat back brackets 602 such that the seat back 206c pivots in the counterclockwise direction (when viewed from FIG. 18), thereby guiding the seat back 206c from the second vertical position to the first vertical position. As the seat back 206c pivots the locking pin 636 travels along the horizontal portion 616 of the arcuate slot 610 toward the vertical portion 612. When the locking pin 636 reaches the vertical portion 612 the lever 628 pivots, returning the locking pin 636 to the first end 614 of the arcuate slot 610, thereby locking the seat back lock mechanisms 626 and preventing the seat back 206c from pivoting relative to the seat cushion 202c.

The seat back lock mechanisms 626 lock prior to the floor latches 300c re-latching the striker bars 234c. Thus, the continued movement of the seat cushion 202c toward the seating position preloads the seat back lock mechanisms 626 by compressing the drive links 302c. The drive links 302c transfer this compressive force to the seat back brackets 602 by urging the seat back brackets 602 to pivot in the counterclockwise direction, which results in the locking pin 636 loading against the vertical portion 612 of the arcuate slot 610. The seat cushion 202c continues to pivot about the main pivot pins 242c until the floor latches 300c are in the latched position, secured to the striker bars 234c.

Figure 19:
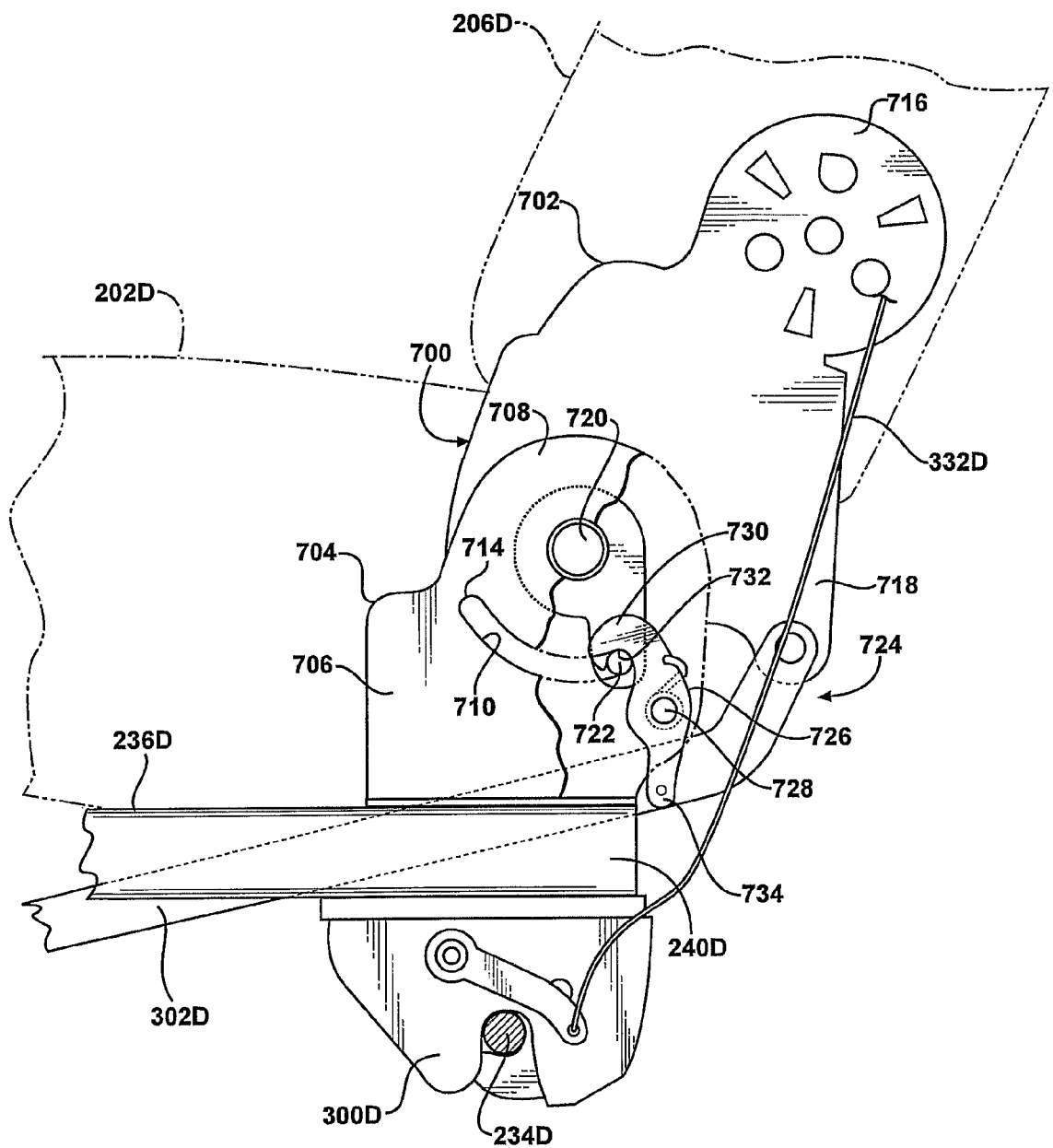
FIG. 19 is a fragmentary, enlarged side view of a sixth embodiment of the seat assembly showing a seat back lock mechanism in a locked condition.
Figure 20:
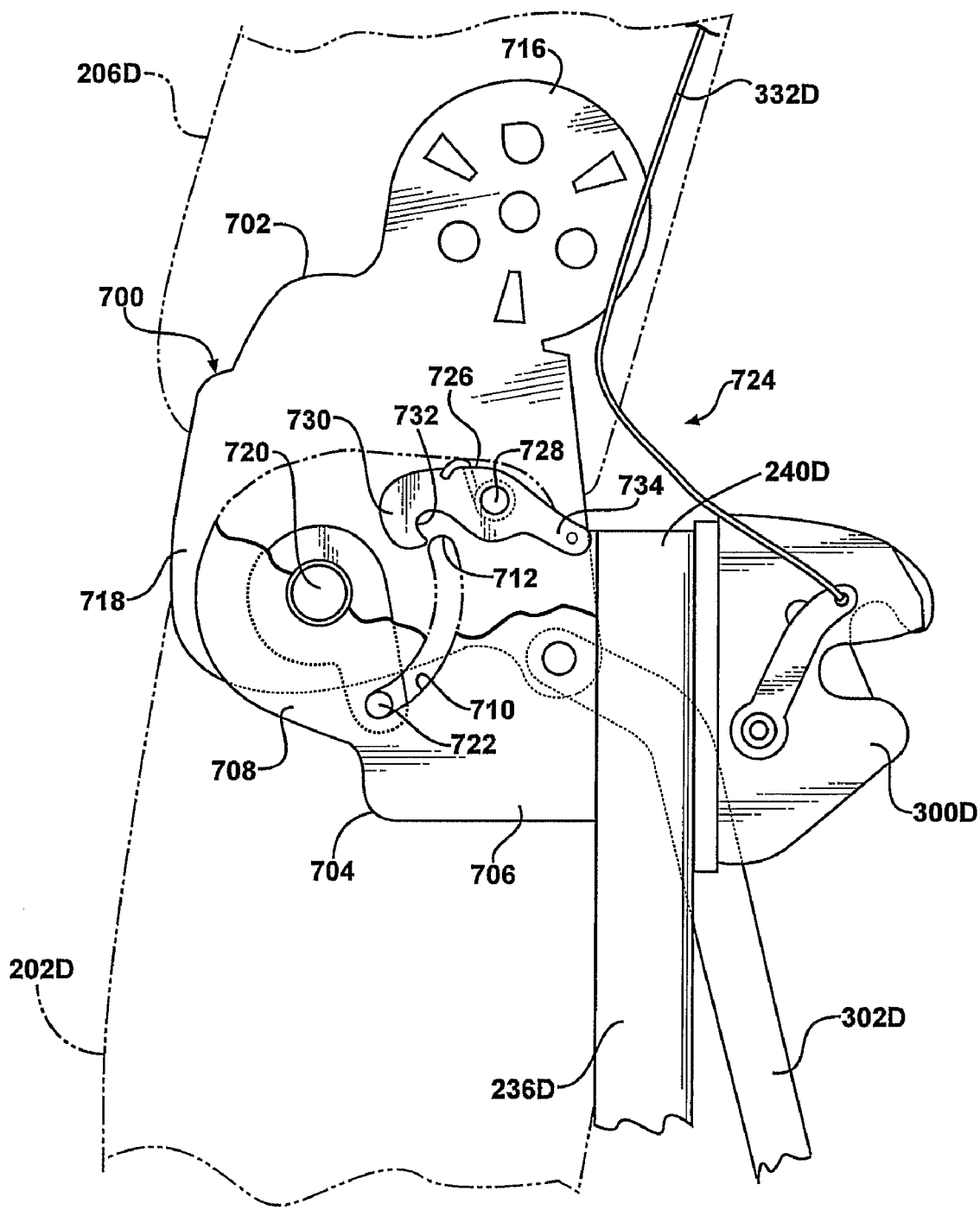
FIG. 20 is a fragmentary, enlarged side view of the sixth embodiment of the seat assembly showing the seat back lock mechanism in an unlocked condition.

Referring to FIGS. 19 and 20, wherein like reference numerals designated by the letter 'd' represent similar elements as those described above, in a sixth embodiment of the invention the seat assembly 200d includes a pair of hinge assemblies, generally indicated at 700. The pair of hinge assemblies 700 operatively coupling the seat back 206d to the seat cushion 202d is provided for pivoting the seat back 206d between the first vertical position and the second vertical position. Each hinge assembly 700 includes a seat back bracket 702 pivotally coupled to a seat cushion bracket 704. The seat cushion bracket 704 of each hinge assembly 700 extends between a first end 706 fixedly secured to the rearward end 240d of the respective support bracket 236d and a second end 708. At least one of the seat cushion brackets 704 include an arcuate slot 710 extending between a first end 712 and a second end 714.

The seat back bracket 702 of each hinge assembly 700 extends between an upper end 716 and a lower end 718. The upper end 716 is operatively coupled to the lower end 210d of the seat back 206d as described above. The lower end 718 is pivotally coupled to the second end 708 of the seat cushion bracket 704 at pivot 720. A pin 722 extends laterally from the lower end 718 of one of the seat back brackets 702 such that it is disposed in the arcuate slot 710 of the seat cushion bracket 704.

At least one of the hinge assemblies 700 also includes a seat back lock mechanism, generally shown at 724, for locking the seat back bracket 702 relative to the seat cushion bracket 704, thereby preventing the seat back 206d from pivoting between the first vertical position and the second vertical position. The seat back lock mechanism 724 includes a spring-loaded hook 726 pivotally coupled to the seat cushion bracket 704 at pivot 728. The spring-loaded hook 726 includes a first end 730 defining a C-shaped slot 732 for selectively engaging the pin 722 and a second end 734. The hook 726 pivots between a pin engaged position, shown in FIG. 19, with the C-shaped slot 732 engaging the pin 722, and a pin released position, shown in FIG. 20, with the C-shaped slot 732 away from the pin 722, thereby unlocking the seat back bracket 702 relative to the seat cushion bracket 704. The hook 726 is spring biased to the pin engaged position. When the seat back 206d is in the first vertical position, the pin 722 is at the first end 712 of the arcuate slot 710 and the hook 726 is in the pin engaged position such that the seat back bracket 702 is locked relative to the seat cushion bracket 704.

In operation, when it is desired to have access to or increase the cargo space behind the seat assembly 200d, the second end 734 of the hook 726 is pulled forward by actuating a cable (not shown) or by manually actuating the hook 726, which pivots the hook 726 in the clockwise direction (when viewed from FIG. 19) from the pin engaged position to the pin released position. With the hook 726 in the pin released position, the seat back lock mechanisms 724 are unlocked allowing the seat back 206d to pivot about pivots 720.

As described above with respect to the second embodiment, the second cable lever 330d is oriented such that it pulls the third cable assembly 332d momentarily after the seat back lock mechanisms 724 unlock. Pulling the third cable assembly 332d causes the floor latches 300d to actuate from the latched position to the unlatched position thereby releasing the striker bars 234d. The torsion springs 244d urge the seat cushion 202d to pivot upwardly and forwardly about the main pivot pins 242d to a neutral position where the floor latches 300d are slightly above the striker bars 234d. As the seat cushion 202d continues to pivot about the main pivot pins 242d, the drive links 302d pull downward on the lower ends 718 of the seat back brackets 702 such that the seat back 206d pivots in the clockwise direction (when viewed from FIG. 19), thereby guiding the seat back 206d from the first vertical position to the second vertical position. As the seat back 206d pivots, the pin 722 travels within the arcuate slot 710 toward the second end 714. When the seat back 206d is in the second vertical position, the pin 722 is at the second end 714 of the arcuate slot 710.

The seat cushion 202d is in the stand-up position when the seat cushion 202d and seat back 206d are generally aligned. The center of gravity of the seat assembly 200d is slightly over center of the main pivot pins 242d ensuring the seat assembly 200d is relatively stable in this position. A lock-out mechanism (not shown) may be included to selectively lock the seat cushion 202d in the stand-up position.

To return the seat cushion 202d to the seating position, the seat back 206d is pushed rearwardly and downwardly. The drive links 302d now push upward on the lower ends 718 of the seat back brackets 702 such that the seat back 206d pivots in the counterclockwise direction (when viewed from FIG. 20), thereby guiding the seat back 206d from the second vertical position to the first vertical position. As the seat back 206d pivots, the pin 722 travels within the arcuate slot 710 toward the first end 712. When the pin 722 reaches the first end 712 the spring bias returns the hook 726 to the pin engaged position, locking the seat back lock mechanisms 724 and preventing the seat back 206d from pivoting relative to the seat cushion 202d.

The seat back lock mechanisms 724 lock prior to the floor latches 300d re-latching the striker bars 234d. Thus, the continued movement of the seat cushion 202d toward the seating position preloads the seat back lock mechanisms 724 by compressing the drive links 302d. The drive links 302d transfer this compressive force to the seat back brackets 702 by urging the seat back brackets 702 to pivot in the counterclockwise direction, which results in the pin 722 loading against the C-shaped slot 732 of the hook 726. The seat cushion 202d continues to pivot about the main pivot pins 242d until the floor latches 300d are in the latched position, secured to the striker bars 234d.

Figure 21:
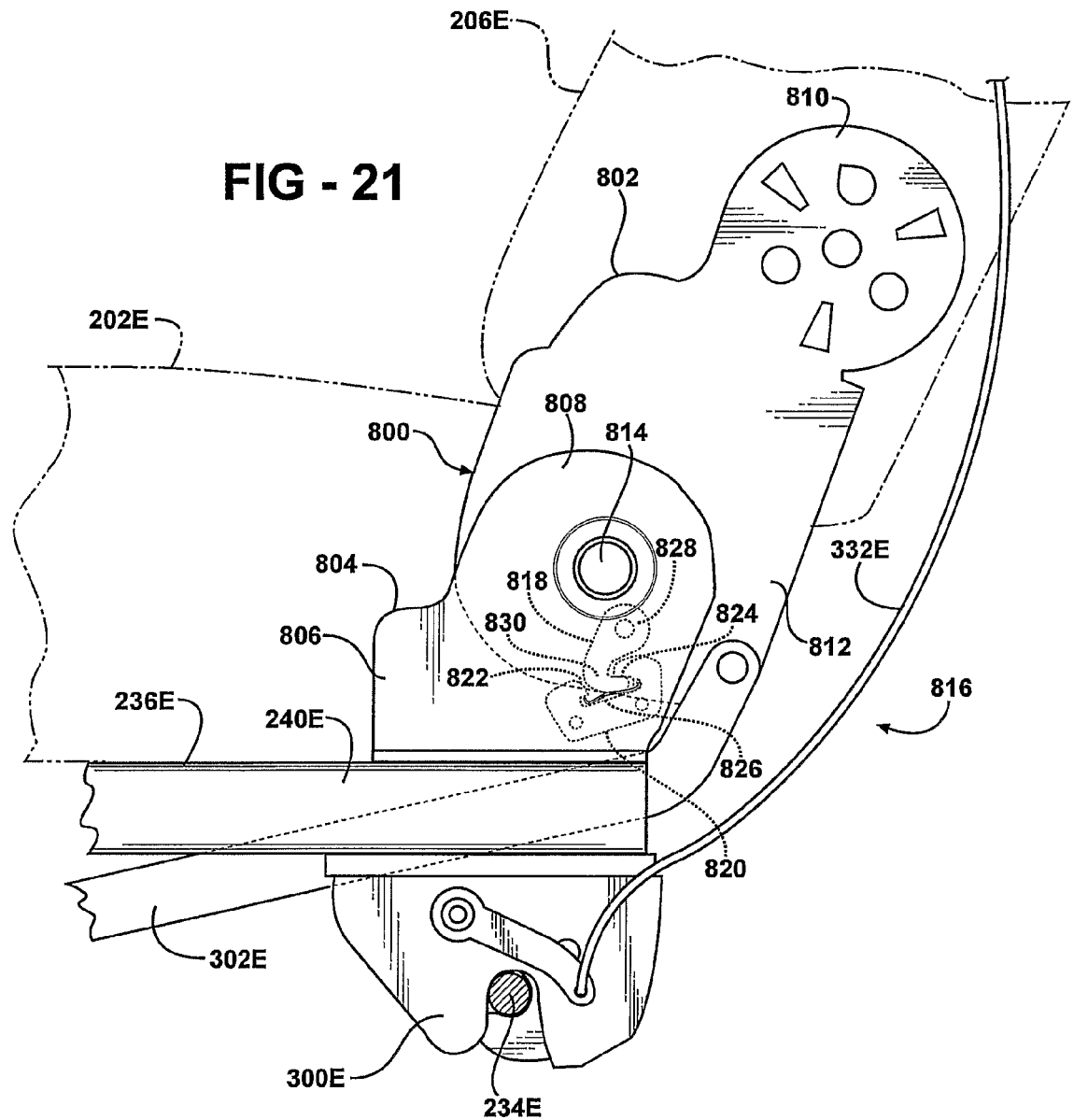
FIG. 21 is a fragmentary, enlarged side view of a seventh embodiment of the seat assembly showing a seat back lock mechanism in a locked condition.
Figure 22:
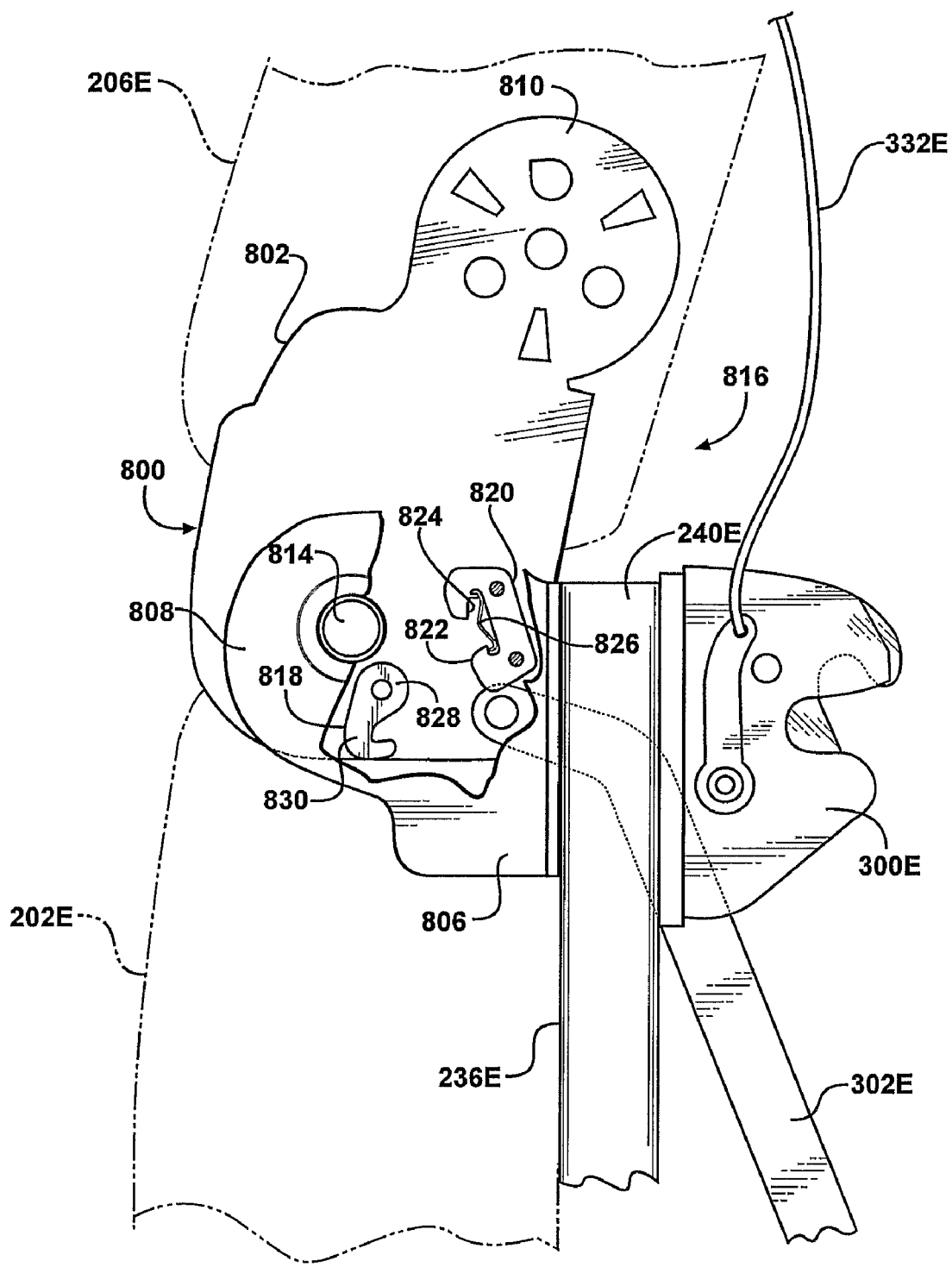
FIG. 22 is a fragmentary, enlarged side view of the seventh embodiment of the seat assembly showing the seat back lock mechanism in an unlocked condition.

Referring to FIGS. 21 through 22, wherein like reference numerals designated with the letter 'e' represent similar elements as those described above, in a seventh embodiment of the invention the seat assembly 200e includes a pair of hinge assemblies, generally indicated at 800. The pair of hinge assemblies 800 operatively coupling the seat back 206e to the seat cushion 202e is provided for pivoting the seat back 206e between the first vertical position and the second vertical position. Each hinge assembly 800 includes a seat back bracket 802 pivotally coupled to a seat cushion bracket 804. The seat cushion bracket 804 of each hinge assembly 800 extends between a first end 806 fixedly secured to the rearward end 240e of the respective support bracket 236e and a second end 808.

The seat back bracket 802 of each hinge assembly 800 extends between an upper end 810 and a lower end 812. The upper end 810 is operatively coupled to the lower end 210e of the seat back 206e as described above. The lower end 812 is pivotally coupled to the second end 808 of the seat cushion bracket 804 at pivot 814.

At least one hinge assembly 800 also includes a seat back lock mechanism, generally shown at 816, for locking the seat back bracket 802 relative to the seat cushion bracket 804, thereby preventing the seat back 206e from moving between the first vertical position and the second vertical position. The seat back lock mechanism 816 includes a hook 818 and a generally C-shaped lock feature 820. The lock feature 820 is fixedly secured to the seat cushion bracket 804 and includes an opening 822 having a hook interface 824. A leaf spring 826 disposed within the opening 822 of the lock feature 820 is retained therein.

The hook 818 extends between a proximal end 828 fixedly secured to the seat back bracket 802 and a free distal end 830 for selectively engaging the hook interface 824 of the lock feature 820. When the seat back 206e is in the first vertical position, the distal end 830 of the hook 818 is disposed within the opening 822 of the lock feature 820 compressing the leaf spring 826 and engaging the hook interface 824 such that the seat back bracket 802 is locked relative to the seat cushion bracket 804.

In operation, when it is desired to have access to or increase the cargo space behind the seat assembly 200e, the floor latches 300e are actuated from the latched position to the unlatched position, thereby releasing the striker bars 234e to allow the seat cushion 202e to pivot upwardly and forwardly. As the seat cushion 202e pivots about the main pivot pins 242e, the drive links 302e pull downward on the lower ends 812 of the seat back brackets 802 such that the seat back 206e pivots about pivots 814 in the clockwise direction (when viewed from FIG. 21). At the same time, the hook 818 moves with the seat back 206e which causes the distal end 830 to separate from the hook interface 824 allowing the drive links 302e to guide the seat back 206e from the first vertical position to the second vertical position.

The seat cushion 202e is in the stand-up position when the seat cushion 202e and seat back 206e are generally aligned. The center of gravity of the seat assembly 200e is slightly over center of the main pivot pins 242e ensuring the seat assembly 200e is relatively stable in this position. A lock-out mechanism (not shown) may be included to selectively lock the seat cushion 202e in the stand-up position.

To return the seat cushion 202e to the seating position, the seat back 206e is pushed rearwardly and downwardly. The drive links 302e now push upward on the lower ends 812 of the seat back brackets 802 such that the seat back 206e pivots about pivots 814 in the counterclockwise direction (when viewed from FIG. 22). Thus, the drive links 302e guide the seat back 206e from the second vertical position to the first vertical position. At the same time, the hook 818 moves with the seat back 206e which causes the distal end 830 to re-enter the opening 822 of the lock feature 820, compressing the leaf spring 826 and re-engaging the hook interface 824, thereby-locking the seat back lock mechanism 816 and preventing the seat back bracket 802 from moving relative to the seat cushion bracket 804.

The seat back lock mechanism 816 locks prior to the floor latches 300e re-latching to the striker bars 234e. Thus, the continued movement of the seat cushion 202e toward the seating position preloads the seat back lock mechanism 816 by compressing the drive links 302e. The drive links 302e transfer this compressive force to the seat back brackets 802 by urging the seat back brackets 802 to pivot in the counter-clockwise direction, which results in the distal end 830 of the hook 818 loading against the hook interface 824. The seat cushion 202e continues to pivot about the main pivot pins 242e until the floor latches 300e re-latch to the striker bars 234e.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A seat assembly for supporting an occupant above a floor in an automotive vehicle, said seat assembly comprising:
    a seat back pivotal between a first vertical position for supporting the occupant of said seat assembly and a second vertical position;
    a seat cushion adapted to be releasably coupled to the floor at a rearward end thereof and pivotable relative to the floor about a forward end of said seat cushion between a generally horizontal seating position for supporting the occupant of said seat assembly and a generally upright vertical position;
    a pair of hinge assemblies operatively coupling said seat back to said seat cushion, said pair of hinge assemblies defining a selectively pivotal connection directly connecting said seat back and said pair of hinge assemblies, and said pair of hinge assemblies enabling pivotal movement of said seat back between said first and second vertical positions as said seat assembly moves between a seating position and a stand-up position wherein said seat cushion and seat back are generally vertically aligned in said respective upright vertical position and second vertical position; and
    at least one drive link pivotally coupling said hinge assemblies relative to the floor, whereby said drive link controls said pivotal movement of said seat back between said first vertical position and said second vertical position in response to pivotal movement of said seat cushion between said horizontal seating position and said upright vertical position as said seat assembly moves between said seating and stand-up positions;
    wherein said seat back does not pivot at said selectively pivotal connection as said seat back moves between said first vertical position and said second vertical position.

2. A seat assembly as set forth in claim 1 wherein said pair of hinge assemblies include a seat cushion bracket fixedly secured to said seat cushion and a seat back bracket operatively coupled to said seat back at said selectively pivotal connection and said seat back bracket is pivotally coupled to said seat cushion bracket, said at least one drive link pivotally coupled to said seat back bracket whereby said at least one drive link controls said pivotal movement of said seat back as said seat assembly moves between said seating and stand-up positions.

3. A seat assembly as set forth in claim 2 including a pair of seat back recliner mechanisms operatively coupling said pair of hinge assemblies to said seat back at said selectively pivotal connection thereby providing selective angular adjustment of said seat back relative to said seat cushion.

4. A seat assembly as set forth in claim 3 including at least one seat back lock mechanism selectively coupling said seat cushion to one of said pair of hinge assemblies, said seat back lock mechanism including a pawl operatively engaging said one of said pair of hinge assemblies to said seat cushion thereby preventing relative movement therebetween when said seat assembly is in said seating position and disengaging said one of said pair of hinge assemblies from said seat cushion thereby enabling movement of said seat assembly between said seating and stand-up positions.

5. A seat assembly as set forth in claim 3 including a head restraint pivotally mounted to said seat back for movement between an operative position extending generally vertically from said seat back and a stowed position pivoted relative to said operative position in response to movement of said seat assembly between said seating and stand-up positions, said head restraint having a spring biasing said head restraint to said stowed position.

6. A seat assembly as set forth in claim 3, wherein said pair of seat back recliner mechanisms are ganged together for cooperative operation, and one of said pair of seat back recliner mechanisms includes a recliner handle, a recliner link and a release link, said recliner handle pivotally mounted to said seat cushion, said recliner link pivotally and slidably coupled to said recliner handle and pivotally coupled to said release link, said release link engaging said one of said pair of seat back recliner mechanisms, whereby pivotal movement of said recliner handle responsively moves said pair of seat back recliner mechanisms between locked and unlocked states, and wherein said recliner handle rotates with said seat cushion during movement of said seat assembly between said seating and stand-up positions.

7. A seat assembly as set forth in claim 3 including at least one seat back lock mechanism selectively coupling said seat cushion to one of said pair of hinge assemblies, wherein said at least one seat back lock mechanism includes an arcuate slot disposed in said seat cushion bracket, said arcuate slot extending between a vertical portion interconnected with a horizontal portion, and a lever pivotally coupled to said seat back bracket, said lever having a pin extending laterally therefrom disposed in said arcuate slot, said seat back lock mechanism operable between a locked condition with said pin disposed within said vertical portion of said arcuate slot and a released condition with said pin disposed within said horizontal portion of said arcuate slot in response to pivotal movement of said lever.

8. A seat assembly as set forth in claim 3 including at least one seat back lock mechanism selectively coupling said seat cushion to one of said pair of hinge assemblies, wherein said at least one seat back lock mechanism includes an arcuate slot disposed in said seat cushion bracket, a hook pivotally coupled to said seat cushion bracket, and a pin extending laterally from said seat back bracket disposed in said arcuate slot, said seat back lock mechanism operable between a locked condition with said hook engaging said pin and a released condition with said hook away from said pin in response to pivotal movement of said hook.

9. A seat assembly as set forth in claim 3 including at least one seat back lock mechanism selectively coupling said seat cushion to one of said pair of hinge assemblies, wherein said at least one seat back lock mechanism includes a generally C-shaped lock feature having a hook interface, said lock feature fixedly secured to said seat cushion bracket and oriented for receiving a hook, said hook extending between a proximal end fixedly secured to said lower end of said seat back bracket and a distal end, said seat back lock mechanism operable between a locked condition with said distal end of said hook engaging said hook interface, and a released condition with said distal end of said hook separated from said hook interface.

10. A seat assembly as set forth in claim 3 including at least one seat back lock mechanism selectively coupling said seat cushion to one of said pair of hinge assemblies, wherein said at least one seat back lock mechanism includes a pin operatively coupled to said seat cushion bracket and a first hole in said seat back bracket, said seat back lock mechanism operable between a locked condition with said pin extending into said first hole and a released condition with said pin retracted from said first hole.

11. A seat assembly as set forth in claim 10 including a second hole in said seat cushion bracket, wherein said pin extends into said second hole locking said seat back relative to said seat cushion when said seat assembly is in said stand-up position.

12. A seat assembly as set forth in claim 3, wherein said seat cushion includes a pair of seat tracks enabling fore and aft adjustment of said seat assembly relative to said floor.

13. A seat assembly as set forth in claim 12, wherein said pair of seat tracks has a towel bar to selectively lock and unlock said pair of seat tracks, said towel bar having a hinged portion that rotates between a deployed position and a retracted position as said seat assembly moves between said seating and stand-up positions, said hinged portion biased to said deployed position.

14. A seat assembly as set forth in claim 12, wherein said seat cushion includes a pair of support brackets supporting said seat cushion, each of said pair of support brackets pivotally coupled to said pair of seat tracks.

15. A seat assembly as set forth in claim 14 wherein said pair of support brackets has at least one floor latch, said floor latch operable to lock said seat assembly to the floor when said seat assembly is in said seating position and operable to unlatch said seat assembly allowing said pivotal movement of said seat cushion between said horizontal seating position and said upright vertical position.

16. A seat assembly as set forth in claim 1 including a pair of seat back recliner mechanisms operatively coupling said pair of hinge assemblies to said seat back at said selectively pivotal connection thereby providing selective angular adjustment of said seat back relative to said seat cushion.

17. A seat assembly as set forth in claim 16 including at least one seat back lock mechanism selectively coupling said seat cushion to one of said pair of hinge assemblies, said seat back lock mechanism including a cam surface operatively engaging said one of said pair of hinge assemblies to said seat cushion thereby preventing relative movement therebetween when said seat assembly is in said seating position and disengaging said one of said pair of hinge assemblies from said seat cushion thereby enabling movement of said seat assembly between said seating and stand-up positions.

18. A seat assembly as set forth in claim 17 including a head restraint pivotally mounted to said seat back for movement between an operative position extending generally vertically from said seat back and a stowed position pivoted relative to said operative position in response to movement of said seat assembly between said seating and stand-up positions, said head restraint having a spring biasing said head restraint to said stowed position.

19. A seat assembly as set forth in claim 18, wherein said seat cushion includes a pair of seat tracks enabling fore and aft adjustment of said seat assembly relative to said floor.

20. A seat assembly as set forth in claim 19, wherein said pair of seat tracks has a towel bar to selectively lock and unlock said pair of seat tracks, said towel bar having a hinged portion that rotates between a deployed position and a retracted position as said seat assembly moves between said seating and stand-up positions, said hinged portion biased to said deployed position.

21. A seat assembly as set forth in claim 20, wherein said seat cushion includes a pair of support brackets supporting said seat cushion, each of said pair of support brackets pivotally coupled to said pair of seat tracks.

22. A seat assembly as set forth in claim 21, wherein said pair of support brackets has a forward rod extending therebetween, said at least one drive link is operatively coupled to said forward rod, whereby movement of said forward rod with said pair of support brackets urges said at least one drive link to control said pivotal movement of said seat back between said first and second vertical positions.

23. A seat assembly as set forth in claim 22 wherein said at least one drive link engages a rearward rod extending between said pair of hinge assemblies and said rearward rod ganging rotation of said pair of hinge assemblies together.

* * * * *